Figure 1:
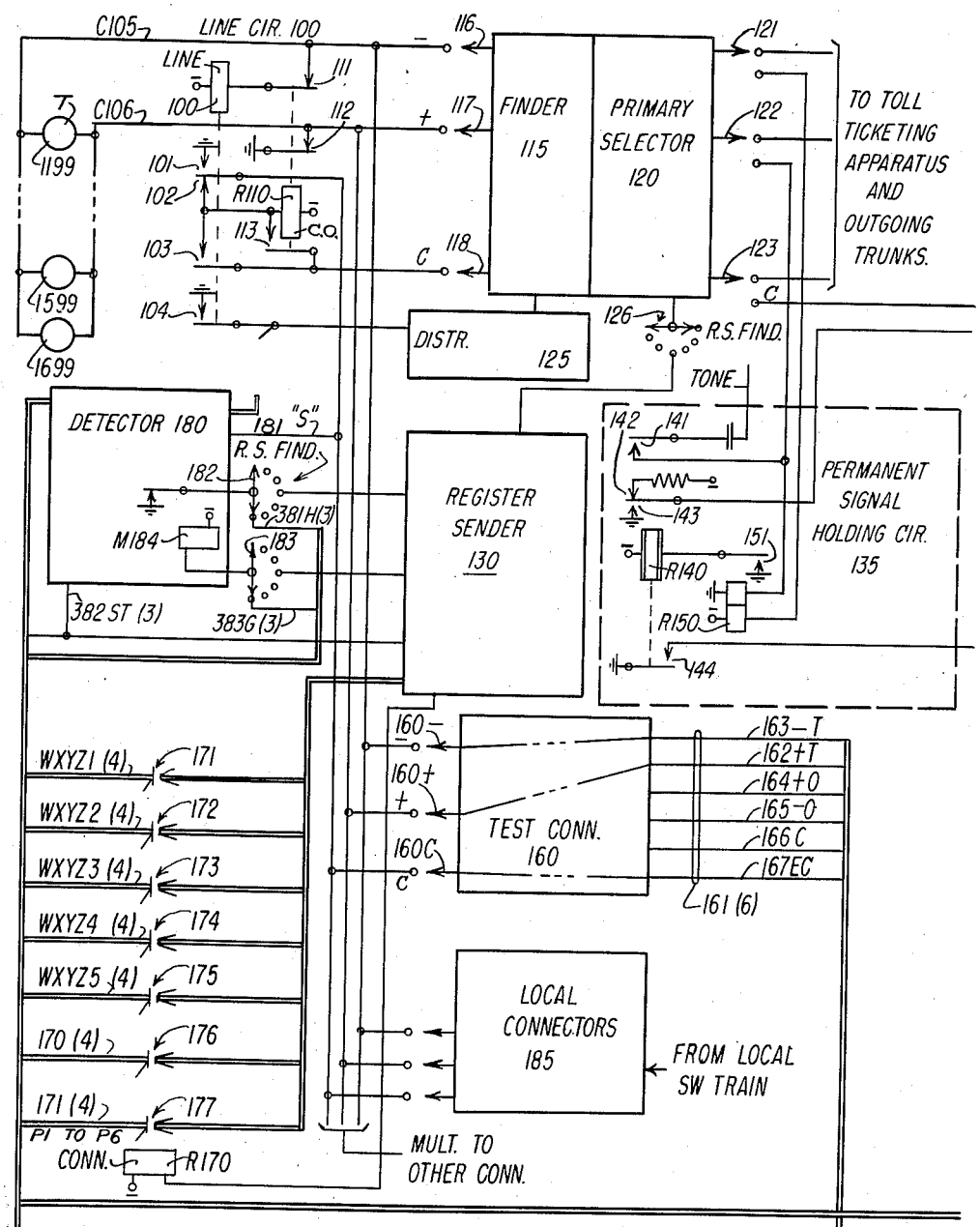

INVENTOR.
Thomas G. Walsh

United States Patent Office 2,866,008
Patented Dec. 23, 1958

2,866,008

TESTING APPARATUS FOR CALLING LINE IDENTIFIERS

Thomas G. Walsh, San Fernando, Calif., assignor to General Telephone Laboratories, Incorporated, a corporation of Delaware Application February 28, 1955, Serial No. 491,100

22 Claims. (Cl. 179—27)

The present invention relates to improvements in automatic telephone systems in general and in particular to improved apparatus for testing calling line identification equipment of the type that is normally provided in automatic toll ticketing telephone systems for the purpose of ascertaining the directory number of a calling subscriber station.

In an automatic toll ticketing telephone system of the type disclosed, for example, in John E. Ostline Patent No. 2,678,353, granted May 11, 1954, and in the Harry N. Newstedt application Serial No. 217,923, filed March 28, 1951, now Patent No. 2,775,648, granted December 25, 1956, a common line detecting or identifying unit of the type disclosed in the Ostline Patent No. 2,639,330, granted May 19, 1953, is employed to determine the directory number of a calling station and to store the determined number in the register sender of the system. This stored information is subsequently recorded with other pertinent items of information pertaining to a toll call.

In prior systems of the type noted above, no provisions have been made for conveniently testing the operating of the common detector or line identification apparatus. Consequently, the faulty operation of the detector unit was not discovered until after the fault had already occurred and the subscriber involved either failed to obtain a complete connection or was automatically routed to an intercepting operator position. In some prior systems faulty conditions which prevented the operation of the identification apparatus would automatically control the register sender to route the call to a busy holding bridge circuit. This busy holding bridge circuit was arranged to signal to the calling subscriber that the particular connection could not be established at the present time.

It is the principal object of the present invention to provide facilities for testing the operation of the common detector or identifying apparatus in an automatic toll ticketing telephone system by merely simulating a calling condition on any telephone line.

It is still another object of the invention to provide the necessary testing apparatus for determining the directory number of a calling subscriber station that has been automatically routed to a holding bridge circuit because of some faulty condition encountered in attempting to establish a toll connection. One of the faulty conditions that would cause the automatic routing of a call to the holding bridge circuit occurs when the calling line is falsely grounded.

It is still another object of the present invention to provide facilities that may be selectively controlled by the exchange attendant for holding the switching apparatus involved in the automatic routing of a falsely grounded line to the holding bridge, so that the identifier or detector can also be controlled by the attendant to ascertain the directory number of a station on such a calling line.

It is still another object of the invention to provide facilities in the testing apparatus whereby the position of any station on a party line may be ascertained by simulating the initiation of a call from any particular station on a party line.

Further objects and features of the invention pertain to the particular arrangement of the circuit elements of the system whereby the above outlined and additional operating features are attained.

The invention both as to its organization and method of operation, together with further objects and advantages thereof will best be understood by the following specification taken in connection with the accompanying drawings in which Figs. 1 to 10, inclusive, illustrate the apparatus incorporated in an exchange of a telephone system provided with automatic toll ticketing facilities, which apparatus has incorporated therein the features of the invention as briefly outlined above.

Figs. 1 to 10, inclusive, of the drawings may be combined to form a unified system by placing Figs. 1 to 5, inclusive, side-by-side from left to right and then by placing Figs. 6 to 10, inclusive, side-by-side from left to right immediately below Figs. 1 to 5, inclusive. These drawings, when thus combined, illustrate sufficient details of the testing apparatus employed in the exchange, as well as sufficient of the apparatus disclosed in the previously mentioned Ostline patents and Newstedt application, to describe the features of the present invention.

Referring now to the drawings, it will be seen that Fig. 1 schematically illustrates a line circuit 100 associated with a line connected to a subscriber substation T, and other stations if the line is a party line, a finder 115 individually associated with a primary selector 120 and a distributor 125 for allotting finders, such as 115, for use in establishing connections with a calling subscriber substation. The finder 115 and the primary selector 120 may be substantially the same as the corresponding apparatus disclosed in the above mentioned Ostline Patent No. 2,678,353 and in the above mentioned Newstedt application.

In addition to the foregoing, a register sender finder 126 is schematically illustrated for the purpose of associating the primary selector 120 with an idle register sender, such as 130. This register sender and register sender finder may be of the type disclosed in the above mentioned Ostline patents and the detector 180, together with the register sender finder 181, may be of the type illustrated in the Ostline Patent No. 2,639,330.

There is also schematically illustrated in Fig. 1 a test connector 160 and local connectors 185 both having access to the terminals of the subscriber substations in the exchange. The local connectors, such as 185, are included in the local switch train of the exchange whereby connections are established, in a conventional manner, with any of the called subscriber substations terminating in the exchange. The test connector 160, however, is provided to enable the attendant or test man in the exchange to establish connections with subscriber lines for the purpose of making various types of tests thereon including the tests to be explained hereinafter.

A permanent signal holding circuit 135 is shown in Fig. 1, for the purpose of holding the apparatus involved in a connection and for transmitting a tone signal to the subscriber connected thereto to indicate that the connection cannot be completed. The register sender 130 is arranged, for example, so that when a calling subscriber line has a false ground condition thereon of the type that would prevent a charge for the connection from being assessed against the proper calling station, it will automatically route such a connection to the permanent signal holding circuit 135. A plurality of such circuits may be provided.

Figure 2:
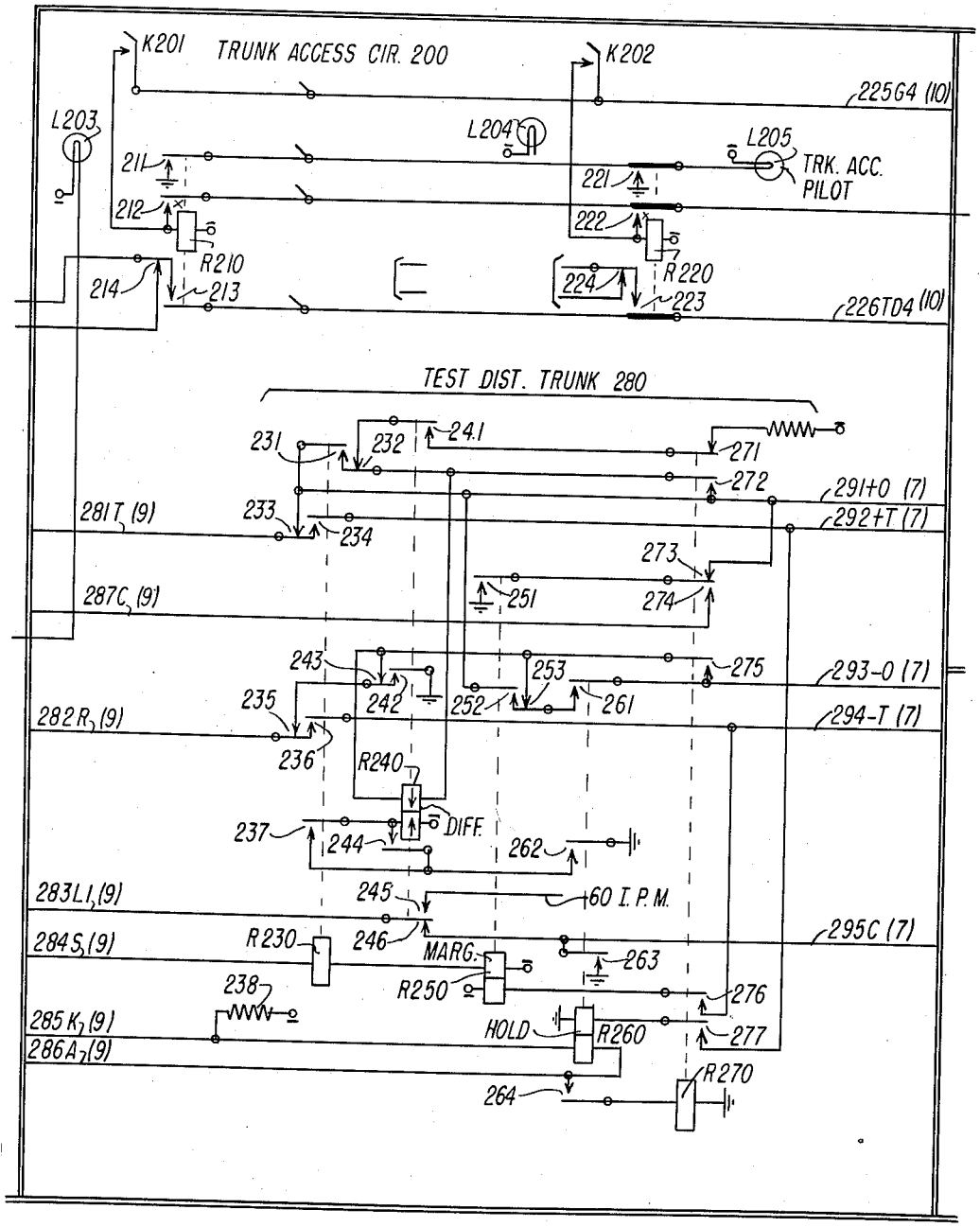

Figs. 2 to 10, inclusive, illustrate the apparatus provided for use by the exchange attendant or test man for the purpose of testing the operation of the detector 180 and for use in connection with ascertaining the directory number of any station involved in a call that has been routed to a permanent signal holding circuit. Thus, the test distributor trunk 280 of Fig. 2 is directly connected to the test distributor 600 of Figs. 6 and 7 and the latter mechanism, through its various wipers and associated bank contacts has access to test connector, such as 160 (Fig. 1), which are operative to select a set of contacts in the associated contact banks terminating a desired station.

The foregoing train of switches including the test distributor trunk 280, the test distributor 600 and the test connectors 160 are selected when the exchange attendant operates the unit 1 test distributor detect key K901. A second train of switches, such as those described above, may be alternatively selected by actuating the unit 2 test distributor detect key K902 to connect up the unit 2 test distributor trunk 280A having access to subscribers lines for example in a second exchange. The test equipment under control of the exchange attendant also includes a start key K1010, a test key K1015, a code check key K1016, a test distributor test key K1020, a connector release key K1030, a dial or calling device D1050 and a receiver R1070 and associated equipment illustrated in Fig. 9.

Figure 9:
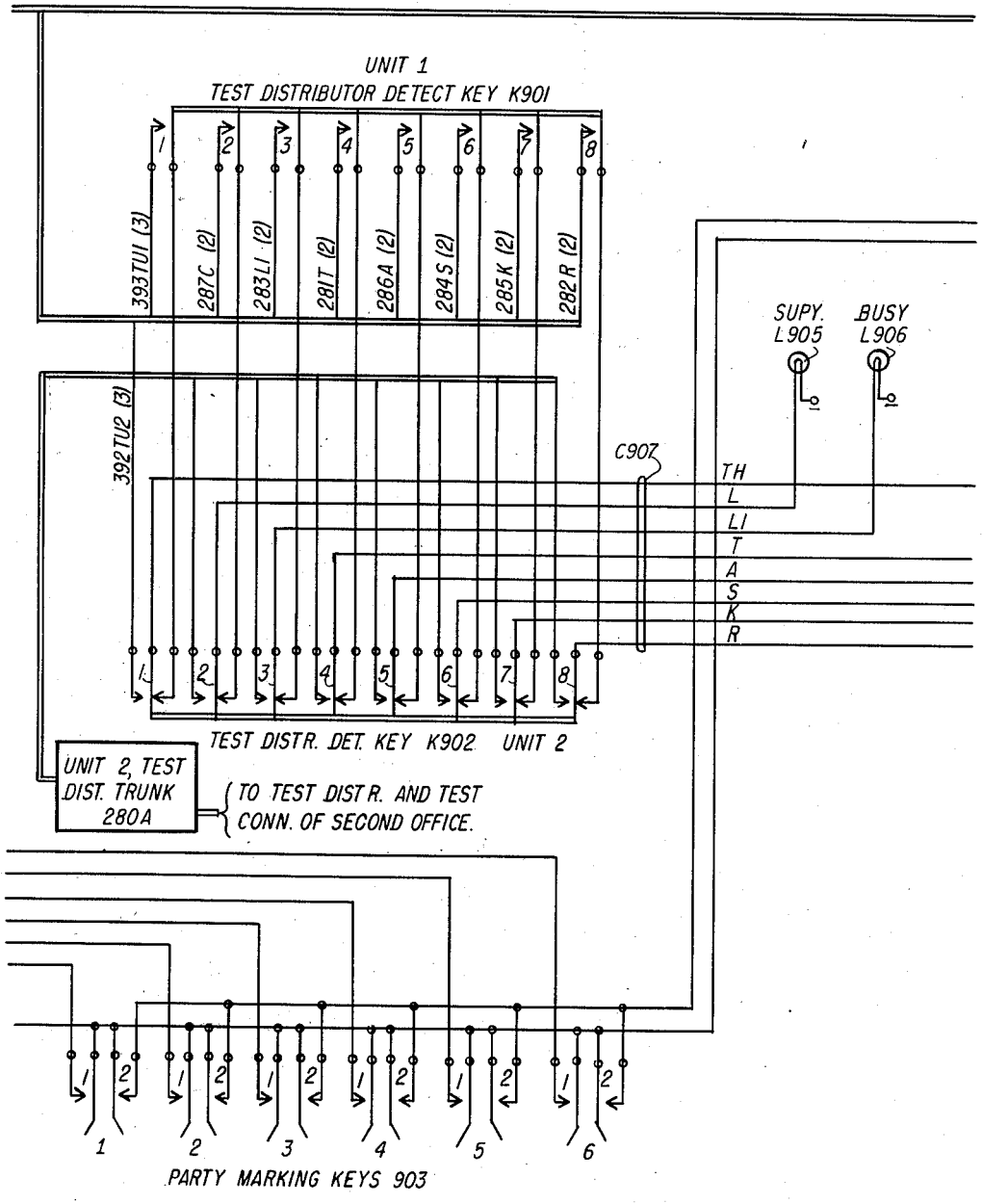

Fig. 9, in addition to illustrating the keys K901 and K902, described above, also includes party marking keys K903 which may be actuated by the exchange attendant to select the position of a station on a party line.

Figure 3:
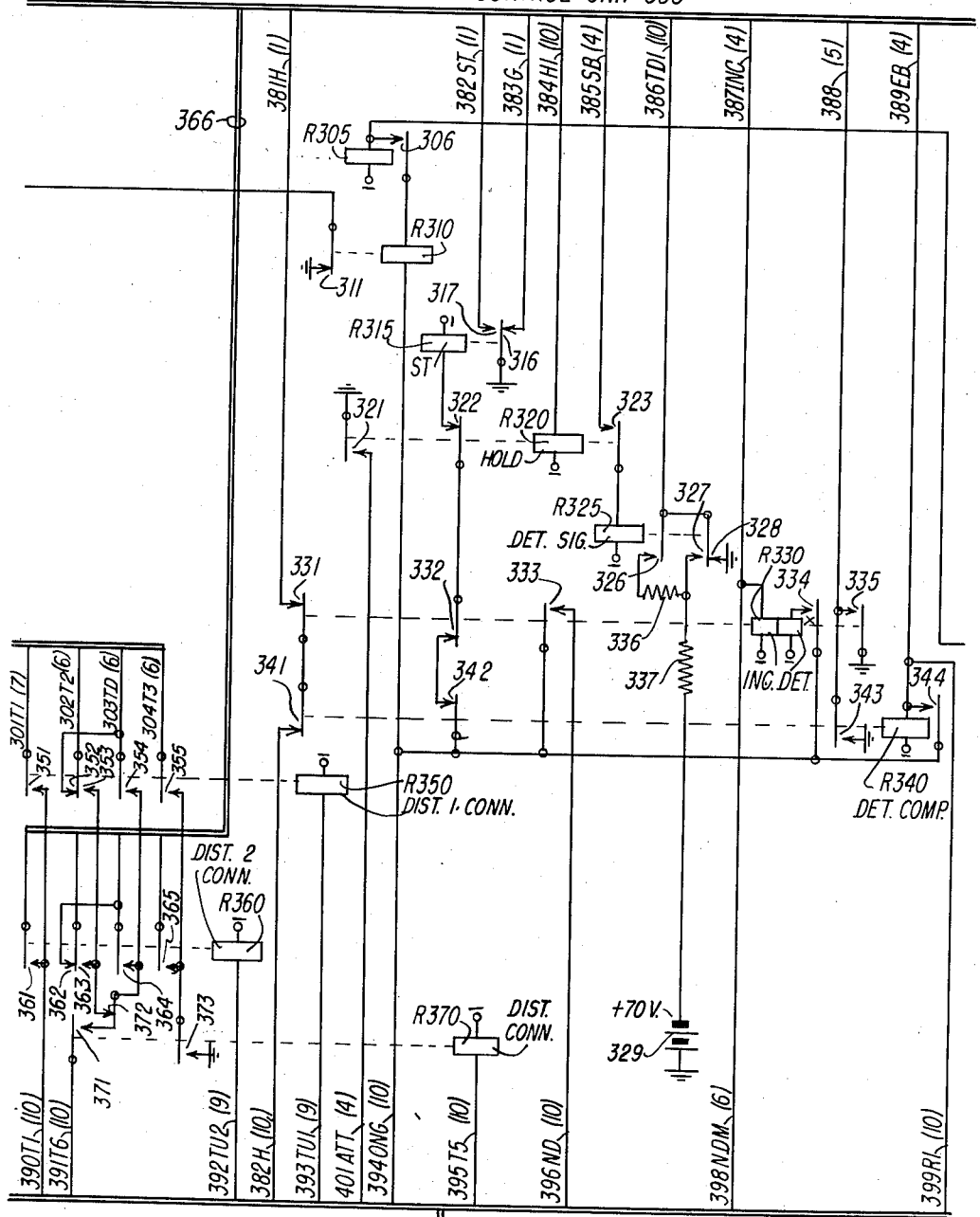
Figure 4:
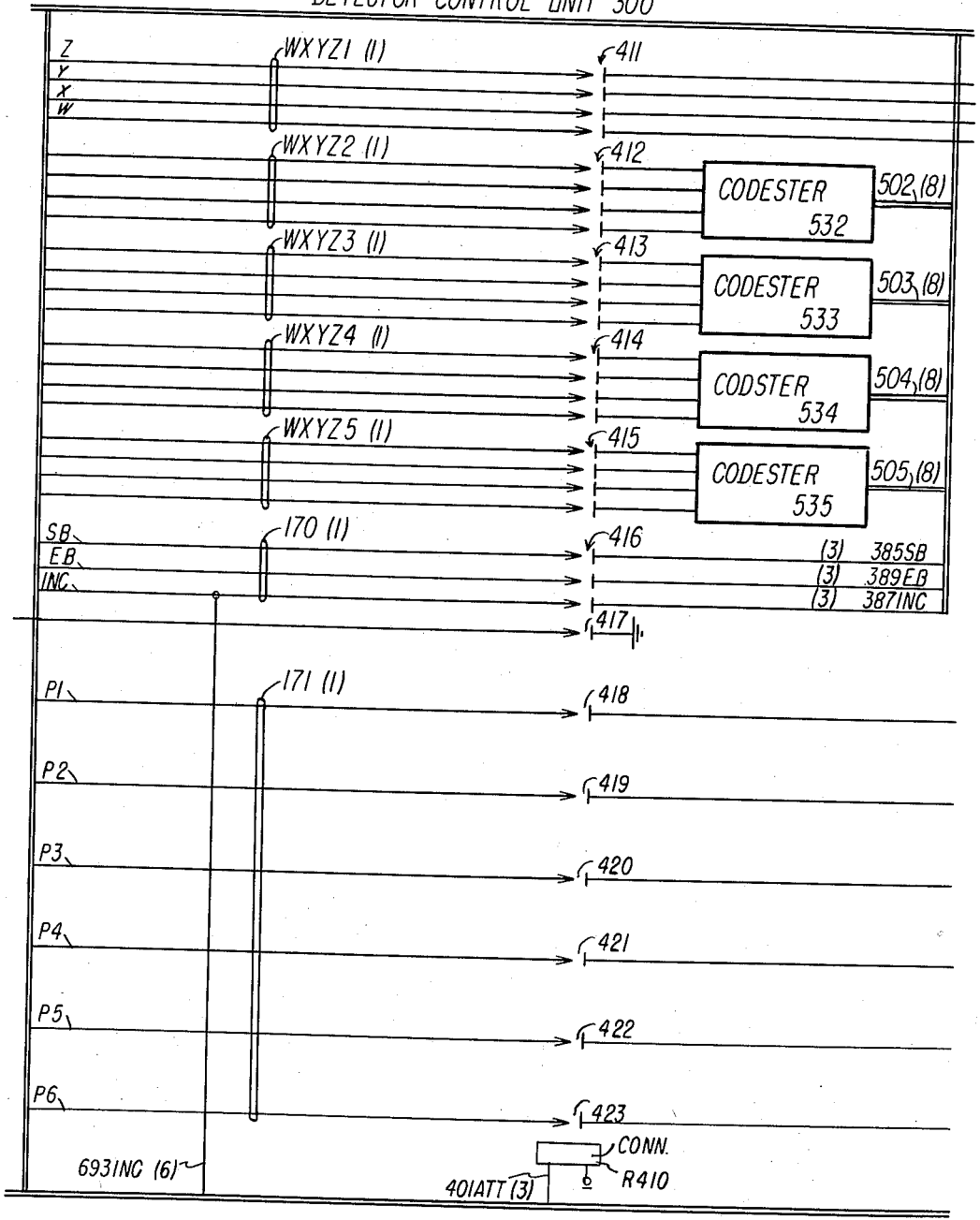
Figure 5:
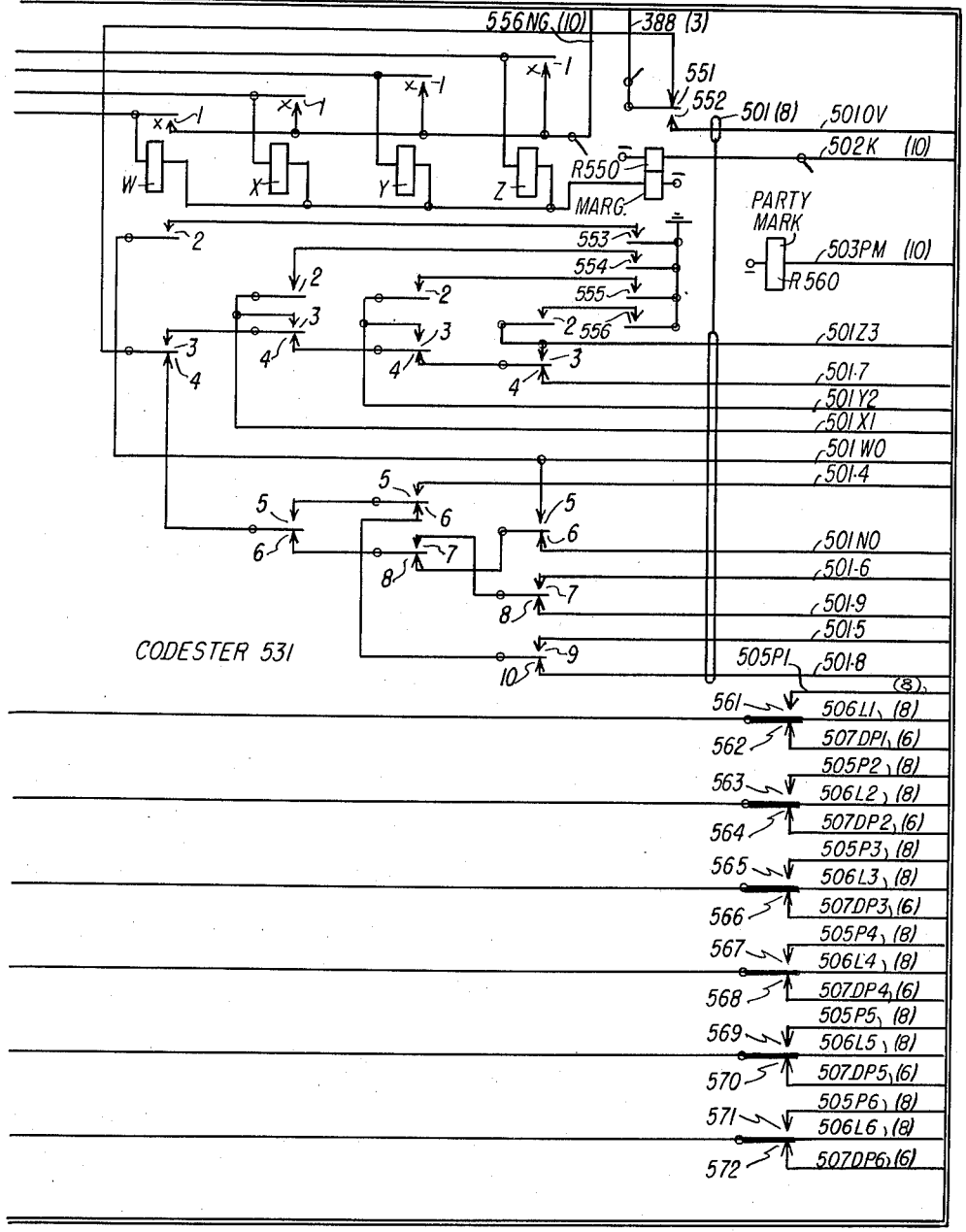
Figure 8:
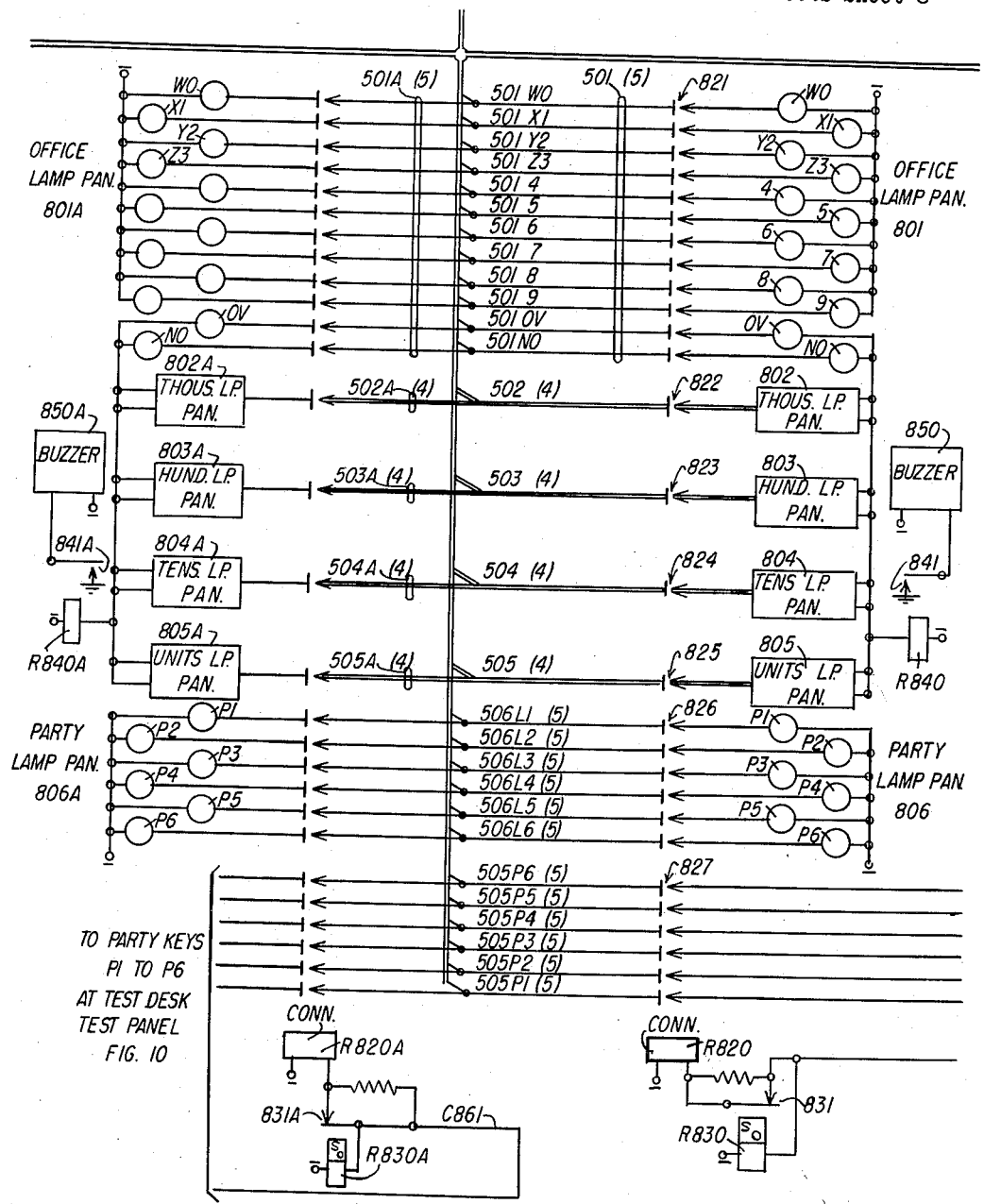

The detector control unit 300 illustrated in Figs. 3, 4 and 5 is utilized by the exchange attendant to control the detector 180 and to associate the same with the testing equipment so the results of the operation of the detector 180 may be displayed to the exchange attendant by the lamp panels shown in Fig. 8.

Figs. 4 and 5 include details of the codester 531 whereas the codester 532 to 535, inclusive, are shown in block diagram form. The latter codesters are exactly the same as the codester 531 and they are connected to the detector 180 by the connect relay R410.

In the toll ticketing systems disclosed in the previously mentioned Ostline patents and in the previously mentioned Newstedt application, serve rather large metropolitan areas and adjacent suburban areas. Calls initiated at the different subscriber substations in an exchange may be completed under control of the register sender to the desired destination. During the time the register sender is operated to register the digits of the directory number of the called station, it also controls the various switches in the exchange to establish the connection and to include in the connection a toll ticketing repeater and the necessary recording apparatus whereby a record may be produced of the items of information pertaining to the call. At an appropriate time during the establishment of the connection, the register sender will call for a detector of the type illustrated in the Ostline Patent No. 2,639,330 so that the directory number of the calling subscriber substation will be automatically ascertained and registered in the register sender. These operations, as far as the present disclosure is concerned, will now be generally described for a better understanding of the operations involving the test equipment, of the present invention.

If the subscriber at substation T desires to establish a toll call in which a record must be made of the items of information, the removal of the receiver (not shown) will complete a loop circuit including the line conductors C105 and C106, contacts 111 and 112, the winding of the line relay R100 and battery and ground, respectively. This loop circuit will cause the line relay R100 to operate in a conventional manner to apply the busy marking ground potential, at the contacts 101, to the C conductor extending to the bank contacts of all of the local connectors, such as 185, and to the corresponding banks accessible to the test connectors, such as 160. Also, the relay R100, at its contacts 102, will disconnect the winding of the cut-off relay R110 from the C conductor extending to the above mentioned connector bank terminals and it will instead, at its contacts 103, connect the winding of the cut-off relay R110 to the C bank contacts accessible to the wiper 118 on the finder 115. It should be understood, however, that other finders corresponding to the finder 115 also have access to the terminals of the calling subscribed line. Finally, at the contacts 104, the line relay R100 will complete a circuit for starting the operation of the distributor 125, whereby a finder, such as 115, will be automatically operated in a vertical and then in a rotary direction to cause its wipers 116 to 118, inclusive, to connect with the —, + and C terminals of the line circuit 100.

As soon as the wiper 118 of the finder 115 engages the C terminal individual to the line circuit 100, ground potential will be applied to the circuit including the contacts 103 for operating the cut-off relay R110. The latter relay, at its contacts 113, will immediately lock itself to the circuit including ground at the wiper 118 and, at its contacts 111 and 112, it will disconnect the line relay R100 from the loop circuit including the line conductors C105 and C106. The relay R100 upon restoring to normal will open the above described circuits, at its contacts 101, 103 and 104, and, at its contacts 102, it will now connect the locking ground potential applied to the circuit including the wiper 118 to the C conductor extending to the bank contacts accessible to the connectors, such as 185, and to the test connectors, such as 160.

As soon as the finder 115 connects with the calling line in the manner noted above, a register sender finder 126 will associate an idle register sender, such as 130, with the calling line. A dial tone signal will then be transmitted to the subscriber at substation T to indicate that the dialing of the digits of the called station directory number may be started.

It may be assumed that the standard seven digit number arrangement will be utilized for the directory numbers of all subscriber stations. The first three digits will correspond to the code of the exchange terminating the station and the last four digits will correspond to the station number of the particular station in the designated exchange. All of the foregoing digits of a called subscriber number will be registered, for example, in the register sender 130. The register sender in turn will then, in response to a translation of the first three digits, transmit the necessary switch controlling impulses to the primary selector 120, whereby the wipers 121 to 123, inclusive, will be operated in a conventional manner to select an idle trunk extending to the toll ticketing apparatus and outgoing trunk lines (not shown). Additional digits will be transmitted by the register sender 130 to complete the connection to the desired called subscriber substation and simultaneously to store in the toll ticket repeater (not shown) included in the connection all of the digits of the called subscriber station directory number.

During the process of setting-up the foregoing connection under control of the register sender 130, the register sender will call for the detector 180 which may be of the type illustrated in the Ostline Patent No. 2,639,330. Therefore, the register sender finder 181, associated with the detector 180, will be started by the register sender 130 by applying ground potential to the start conductor 382ST. This will cause the magnet 184 to actuate its wipers 182 and 183 until the register sender 130 is selected. The selection of the register sender 130 will cause the connect relay R170 to connect the register sender 130 to the detector 180 through the contacts 171 to 177, inclusive, on the relay R170. Five sets of four code marking conductors WXYZ1 to WXYZ5, inclusive, will be interconnected between the detector 180 and the register sender 130 and six station identifying conductors 171P1 to 171P6 will be interconnected and marked in accordance with the position of the particular calling station on a party line as registered in the register sender. Finally, the conductors 170EB, 170SB and 170INC will interconnect the register sender and the detector 180 for the purpose of indicating the completion of the detection operation, the starting of the detection operation, and the incomplete detection operation respectively of the detector 180. The interconnection of the conductor 170SB with the detector 180 and the register sender 130 will control the register sender to transmit the marking potential of +70 volts (+60 volts as illustrated in the Ostline Patent No. 2,639,330) over the C conductor through the register sender finder 126, primary selector 120, finder 115, wiper 118, contacts 113 and 102, the C conductors extending to the contact banks of the various connectors and the "S" conductor extending to the detector 180. The application of the +70 volt potential to the above circuit will cause the detector 180 to operate in the manner described in the Ostline Patent No. 2,639,330 and ascertain the directory number of the calling station and thereby mark the WXYZ1 to WXYZ5, inclusive, code marking conductors in accordance with the last five digits of the calling station directory number. These digits will then be registered in the register sender 130 and the detector 180 and its register sender finder 181 will be released from the connection in response to a complete detection marking potential applied to the conductor 170EB.

Thereafter, the register sender 130 will transmit, in code form, the last five digits of the calling station directory number as registered therein by the detector 180 to the toll ticketing repeater (not shown) that has been included in the connection. After the connection is completed, as described above, the register sender 130 and the register sender finder 126 will be dismissed from the connection and the calling subscriber substation T may then converse with the desired called subscriber.

During the time the conversation connection is established between the subscribers noted above, the toll ticket repeater (not shown) will register the total elapsed time of the conversation. As soon as the subscriber releases the established connection, the toll ticket repeater (not shown) and the associated toll ticketing recording apparatus will produce a record of the various items of information, including the directory numbers of both the calling and called subscriber substations all in the manner described in detail in the above mentioned Ostline patents and in the Newstedt application.

In the above mentioned Ostline patents and the Newstedt application, the "Director" therein which corresponds to the register sender 130 in the present application, is arranged so that in the event that a subscriber line is falsely grounded and thereby causes the position of the station on a party line to be falsely registered in the associated "Director" which automatically functions to prevent the completion of such a call if it is one that is to be recorded. It also prevents the operation of the associated detector, corresponding to the present detector 180, and the call is instead automatically routed to an intercept operator position. In the present system, it is assumed that under the foregoing conditions, the register sender 130 will prevent the establishment of the connection and will instead transmit the necessary switch controlling impulses to operate the primary selector 120 to connect the calling subscriber line to the permanent signal holding circuit 135. The details regarding this operation will be described in conjunction with the present testing equipment.

*Testing the operation of the detector 180*

In the foregoing description of the operation of the schematically illustrated apparatus of Fig. 1, it was pointed out that the detector 180 is utilized to ascertain the directory number of the calling subscriber station. In order to determine whether or not the detector 180 is operating satisfactorily, it is essential that the telephone exchange be provided with testing equipment whereby the exchange attendant thereat, or test man, may arbitrarily check the operation of the detector 180 by extending a connection to a line to see whether or not the detector will identify and register the digits corresponding to a station on the selected line. In order to control the operation of the detector 180 the exchange attendant may actuate the unit 1 test distributor detect key K901. The unit 1 key K901 is provided, as previously explained, for the purpose of connecting the exchange attendants test equipment to the detector 180. On the other hand, the unit 2 distributor detect key K902 is arranged to connect the test equipment to the unit 2 test distributor trunk 280A (schematically illustrated) whereby a test may be made of another detector, such as 180, provided for the purpose of detecting the directory numbers of subscriber lines that may be detected by the detector 180. As a result of the operation of the key K901, the contacts 1 to 8 thereon prepare or complete certain circuits to the test distributor trunk 280 in Fig. 2. The closing of the contacts 1, 2, 3, 4, 5, 7 and 8 merely prepares points in various circuits, whereas the closing of the contacts 6 will complete a circuit for operating the control relay R230 (Fig. 2) in series with the marginal relay R250 over a circuit which may be traced from battery, upper winding of the marginal relay R250, winding of the relay R230, conductor 284S extending to Fig. 9, contacts 6 on the key K901, normally closed contacts of the armature 6 on the key K902, conductor S, cam contacts 1052 on the calling device D1050, contacts 2 on the key K1030, resistor 1032, and ground. The control relay R230 operates over the above traced circuit, but due to the high resistance of the relay R230 and the resistance of the resistor 1032, the marginal relay R250 does not operate at this time. The circuits controlled by the various contacts on the relay R230 will be explained hereinafter following the description of operation of the hold relay R260.

After operating the key K901, the exchange attendant will actuate the test distributor test key K1020 in order to further control the operation of the test distributor trunk 280 (Fig. 2) that has been selected by the operation of key K901. At the contacts 6, the key K1020 applies ground potential to a circuit including the conductor A, normally closed contacts on the armature 5 on the key K902, contacts 5 on the key K901, conductor 286A extending to Fig. 2, the lower winding of the hold relay R260, and resistor 238, to battery in order to operate the latter relay.

Figure 7:
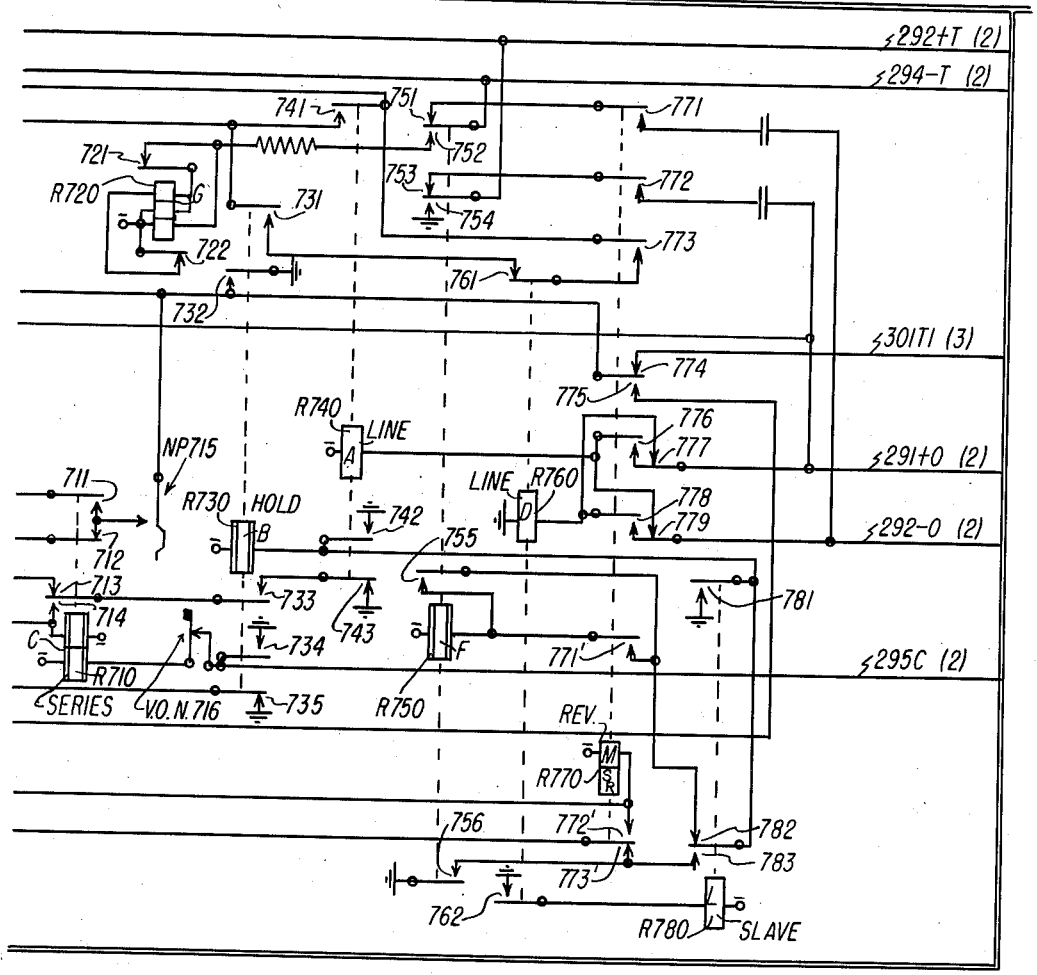

The relay R260, at its contacts 263, now applies ground potential by way of the conductor 295C extending to Fig. 7, vertical off-normal springs VON716 and the lower winding of the series relay R710 to battery, in order to operate the latter relay in the test distributor 600. Also, the ground potential at the contacts 263 is extended by way of a circuit including the contacts 246, conductor 283L1 extending to Fig. 9, contacts 3 on the key K901, normally closed contacts on the armature 3 on the key K902, conductor L1 and the busy lamp L906, to battery, to indicate to the exchange attendant that the test distributor trunk 280 has been seized and is now busy. As a further result of the operation of the hold relay R260, at its contacts 264, the operating ground potential for the circuit for the relay R260 short-circuits the winding of the relay R270. At the contacts 261, the relay R260 connects the conductor 293—O by way of the contacts 253, 243 and 235 to the conductor 282R extending to Fig. 9.

However, in view of the fact that the control relay R230 is operated in the manner previously described, at its contacts 234 and 236, it transfers the conductors 281T and 281R to the test conductors 292+T and 294—T. Also, at the contacts 231, the relay R230 completes a loop circuit for operating the line relays R740 and R760 in the test distributor 600 over a loop circuit including the upper winding of the differential relay R240. This circuit may best be traced from ground potential, of relay R760 (Fig. 7), contacts 777, conductor 291+O extending to Fig. 2, contacts 231, upper winding of the differential relays R240, contacts 253 and 261, conductor 293—O extending to Fig. 7, contacts 779 and the winding of the line relay R740, to battery. The relays R740 and R760 now operate to prepare the test distributor 600 for subsequent operation under control of the dial D1050 at the attendant position.

As a further result of the operation of relay R230, at its contacts 237, it completes a circuit including ground at contacts 262, for energizing the lower winding of the differential relay R240. At the present time, both the upper and lower windings of the differential relay R240 are included in separate energizing circuits, but the relay does not operate at this time because the flow of currents through the upper and lower windings of the relay oppose one another. Therefore, the relay remains in its restored position.

In the above description, it was pointed out that the seizure of the test distributor trunk 280 by the actuation of keys K901 and K1020 by the exchange attendant completed circuits whereby the line relays R740 and R760, and the series relay R710 in the test distributor 600 (Figs. 6 and 7) are operated. As soon as the relay R740 operates, it closes a circuit, at the contacts 742, for operating the hold relay R730. Operation of the line relay R760, at its contacts 762, completes an obvious circuit for operating the slave relay R780. At the contacts 781, the relay R780 completes a multiple circuit for energizing the hold relay R730.

Referring now to the hold relay R730, it will be seen that, at its contacts 734, it applies a multiple ground circuit to the winding of the series relay R710 to operate the latter relay if ground potential has not previously been applied to the conductor 295C. The ground potential at contacts 734, is also applied to the conductor 295C to maintain the circuit for illuminating the busy lamp L906. As a further result of the operation of relay R730, at its contacts 735, it interrupts a point in the incomplete circuit for the release magnet RM629 of the test distributor 600. At its contacts 733, the hold relay R730 prepares a point in the incomplete impulsing circuit for the vertical magnet VM628. The test distributor trunk 280 and the test distributor 600 are now in condition to respond to the impulses of the digits dialed by the exchange attendant.

In view of the foregoing, the exchange attendant may now dial the last four digits of the directory number of any station to determine whether or not the detector 180 will detect that number. All of the subscriber substations having directory number in which the last four digits are in the 1100 group may be individual stations on individual lines or they may be first subscriber substations on party lines. The substations having the last four digits of the directory numbers in the 1200 group, may be limited to second party stations on party lines. The 1200, 1300, 1400, 1500 and 1600 groups may be limited to third, fourth, fifth and sixth party stations on party lines. The remaining stations in the 1700, 1800 and 1900 groups may all be assigned to individual stations on individual lines. Each of the hundreds group in a 10,000 line exchange may be assigned in a similar manner although it is possible that the majority of hundred group may be exclusively assigned to individual stations on individual lines rather than to party stations on party lines. Each of the stations on the different party lines will be assigned on a terminal-per-station basis so that each station is selected, when receiving a call, on separate sets of contacts in the banks of connectors, such as the local connector 185 having access thereto.

In view of the foregoing, it will be assumed that the exchange attendant will simulate a call by the subscriber at substation T having the directory number 1199 by dialing the digits 1199 on the dial D1050. The dialing of these digits controls the test distributor 600 and the test connector 160 to connect with the conductors extending to the line circuit 100 individual to the line conductors connected to substation T.

As soon as the dialed mechanism of the dial D1050 is moved off-normal, the contacts 1052 thereon are opened in order to remove ground potential from the previously traced circuit including the conductor 284S extending to the test distributor trunk 280. As a result thereof, the control relay R230 restores to normal and disconnects, at its contacts 231, a point in the previously traced loop circuit for the upper winding of the relay R240 and, at its contacts 237, it disconnects the circuit for the lower winding of the relay R240. Also, at its contacts 234 and 236, the relay R230 disconnects the conductors 281T and 282R from the test conductor 292+T and 294—T. Also, at the contacts 233 and 235, the conductors 281T and 282R are connected respectively to the operating conductors 291+O and 293—O included in the loop circuit of the line relays R740 and R760 in the test distributor 600. At this time the previously described loop circuit for the line relays R740 and R760 may now be traced from battery, winding of the relay R740, contacts 779, conductor 293—O extending to Fig. 2, contacts 261, 253, 243 and 235, conductor 282R extending to Fig. 9, contacts 8 on the key K901, normally closed contacts on the armature 8 of the key K902, conductor R, monitor key contacts K1040, impulsing contacts 1051, contact 4 on the key K1030, contacts 5 on the key K1020, conductor T, normally closed contacts on the armature 4 on the key K902, contact 4 on the key K901, conductor 281T extending to Fig. 2, contact 233, conductor 291+O extending to Fig. 7, contacts 777 and the winding of the line relay R760, to ground. The relays R740 and R760 remain operated over this loop circuit until the impulsing springs 1051 are interrupted during the return movement of the dial D1050 to transmit the loop impulses. Consequently, the number of impulses corresponding to the digit dialed will be transmitted over the above described circuit to the line relays R740 and R760. Each of the digits dialed will be transmitted to the relays in the same manner.

In the present example, the exchange attendant has dialed the first digit 1 which will cause the impulsing springs 1051 to interrupt the circuit for the line relays R740 and R760 a single time. The relay R740, at its contacts 743, now completes a circuit including contacts 733 and 714 for operating the vertical magnet VM628 and for simultaneously energizing the upper winding of the series relay R710. Also, the relay R760, at its contacts 762, will interrupt the circuit for the slave relay R780 but at the present time the latter relay performs no controls since the hold relay R730 is of the slow-to-release type and remains in its operated position during the time impulses are transmitted by the line relays R740 and R760.

Inasmuch as the test distributor 600 is a conventional vertical and rotary switch mechanism having sets of wipers that are actuated in a vertical direction under control of the vertical magnet VM628 and then actuated in a rotary direction by the rotary magnet RM617, it will be understood that the vertical off-normal contacts VON660 are closed as soon as the wipers 601 to 606, inclusive, are actuated in a vertical direction and the vertical off-normal contacts VON716 are opened. The latter contacts interrupt a point in the circuit for the lower winding of the series relay R710 so that now the latter relay will only remain operated over its upper winding as long as impulses are transmitted to the vertical magnet VM628.

At the end of the dialing of the digit 1 and during the interdigital pause between the dialing of successive digits, the control relay R230 in the test distributor trunk 280 is reoperated by the off-normal contacts 1052 in the dial D1050. Consequently, the line relays R740 and R760 in the test distributor 600 will be held operated in the loop circuit including the upper winding of the differential relay R240. Since the lower winding of the latter relay is again energized over a circuit including contacts 237, the relay R240 remains in its restored position.

In the test distributor 600, the series relay R710 restores to normal during the interdigital pause following the transmission of the first digit 1 and it prepares, at its contacts 713, a point in the circuit including the contacts 632 and 615 for operating the rotary magnet RM617 in multiple with the relay R640.

The exchange attendant may now dial the second digit 1 of the station under test in order to again repeat the operation whereby the control relay R230 restores to normal to complete the impulsing circuit between the dial D1050 and the line relays R740 and R760 in the test distributor 600. The second digit 1, however, will now control the rotary magnet RM617 so that it will rotate the wipers 601 to 606, inclusive, one step in a rotary direction into engagement with the contacts 11 in the respective banks accessible to each of the wipers. The single impulse for controlling the rotary magnet RM617 also operates the relay R640 in multiple therewith. As a result of its operation, the relay R640, at its contacts 641, interrupts a point in the incomplete circuit for the relay R610 in order to prevent operation of the latter relay when the relay R620 is subsequently operated. At the contacts 642, the relay R640 connects the winding of the relay R620 by way of the contacts 631 to ground at contacts 732 on the operated hold relay R730. Operation of the relay R620, at its contacts 621 and 622, disconnects the test conductors 292+T and 294−T from the wipers 601 and 602 in order to prevent these wipers from interfering with trunks extending to test connectors, such as 160, over which the wipers pass. In the present arrangement, the dialing of only the single digit 1 to rotate the wipers 601 to 606, inclusive, one step it would not be necessary to operate the relay R620 but when the wipers are controlled by any of the digits 2 to 10, inclusive, then the wipers noted above could interfere with trunks connected to bank contacts engaged by the wipers during the rotary motion. During the rotary stepping of the wipers under control of the rotary magnet RM617, the relay R640, due to its slow-to-release characteristics, will not restore. It should be noted that each of the sets of bank contacts accessible to each of the above named wipers includes 100 bank contacts 00 to 99, inclusive, terminating conductor extending to a corresponding number of test connectors.

At the present time, it will be assumed that the wipers 601 to 605, inclusive, are in engagement with the conductors in the cable 161 extending to the test connector 160 that is provided for making tests of subscriber lines in the 1100 group. It should be understood, however, that the wipers 601 to 605, inclusive, also have access by way of the associated sets of bank contacts to 100 other test connectors corresponding to each of the different hundreds groups of directory numbers in the exchange. The wiper 606 has access by way of the 100 associated bank contacts to party station conductors 507DP1 to 507DP6, inclusive, which are indicative of the position of subscriber substations on party lines. These different conductors may be strapped, by means of adequate jumpers, to the bank contacts of the different hundreds group in accordance with the type of station that is connected to the corresponding hundreds groups of station terminals. In the present example, it is assumed that the 1100 group serves first party subscriber substations on party lines, as well as individual stations on individual lines. Therefore, the conductor 507DP1, which is indicative of first party subscriber substations and individual subscriber substations, is jumpered to the terminal 11. All other terminals in the bank contacts accessible to the wipers 606 corresponding to a hundreds group serving individual stations or first party subscriber substations on party lines will also be jumpered to the conductor 507DP1. Other terminals in the bank contacts accessible to the wiper 606 will be jumpered to the other conductors 507DP2 to 507DP6, inclusive, depending upon the positions of the subscriber stations in the corresponding hundreds groups.

For example, the 1200 group indicated by the bank contact 12 may be jumpered to the conductor 507DP2 because the latter conductor is indicative of the second subscriber substations on party lines and the 1200 group of stations is assumed to be assigned to subscriber substations that are the second stations on party lines. The remaining hundreds group are similarly connected.

Figure 6:
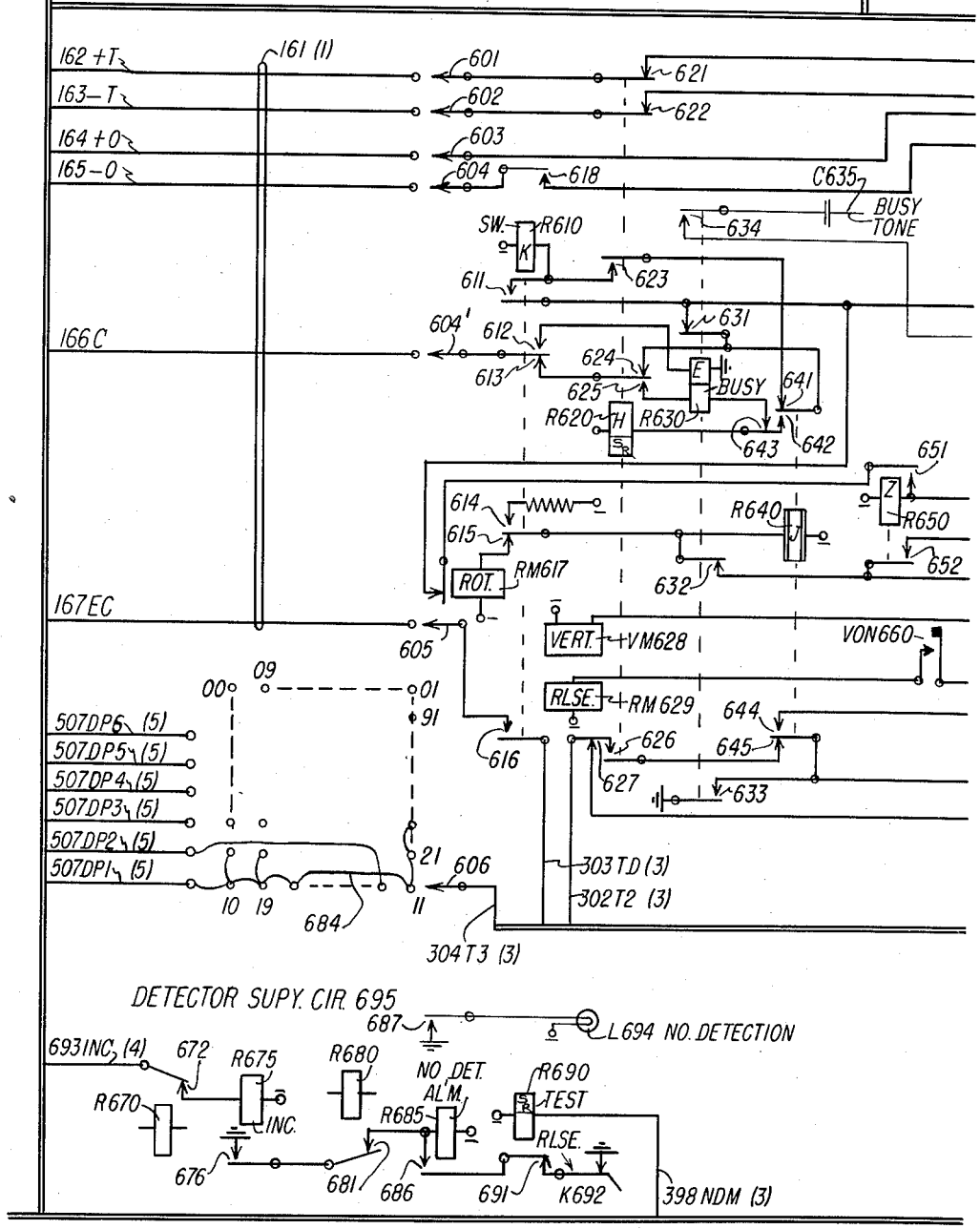

At the present time, the wipers 601 to 605, inclusive, connect with the conductors 162+T to 167EC, inclusive, in the cable 161 extending to Fig. 1 to seize the test connector 160 as previously noted. As a result thereof, a loop circuit is now completed for controlling the line relay (not shown) in the test connector 160. This loop circuit for controlling the test connector 160 includes the contacts 741 on the line relay R740, the wipers 603 and 604, the conductors 164+O and 165−O in the cable 161 extending to Fig. 1 and the line relay (not shown) in the test connector 160. The details of the test connector 160 are not shown but it should be understood that they may be substantially the same as the test connector shown, for example, on page 151 of the publication "Automatic Telephone Practice" (seventh edition) by Harry E. Hershey, published by Technical Publications, P. O. Box 68, Whitewater, Kansas. The test distributor 600 illustrated in Figs. 6 and 7 is substantially the same as the test distributor shown and described at page 148 in the above mentioned Hershey publication and reference may be had to this publication for details for circuit operations which are omitted in the present description.

When the wipers 601 to 605, inclusive, engage the conductors in the cable 161, the relay R640 will restore to normal, after a short delay following the dialing of the second digit 1 into the test distributor 600. As soon as the relay R640 restores to normal it interrupts, at its contacts 642, the previously described circuit for the relay R620 so that the latter relay slowly restores to normal. However, inasmuch as the relay R620 is a slow-to-release relay, it retains its contacts 623, 625 and 626 closed for a short period of time after the contacts 641 and 645 are closed following the restoration of the relay R640.

If it is assumed that the test connector 160 is busy at this time, the conductor 166C in the cable 161 will have ground potential applied thereto so that upon the restoration of the relay R640, as described above, the ground potential will be extended by way of the wiper 604, contacts 613 and 625, lower winding of the busy relay R630, contacts 643, and the winding of the relay R620, to battery. Thus, the relay R620 is now retained operated from a busy marking ground applied to the conductor 166C by the busy test connector 160. The fact that the busy test connector 160 is encountered at this time is of no importance in connection with the present invention and it may be sufficient to state that the operation of the relay R630 by a busy test connector 160 will transmit the busy tone on the conductor C635 by way of its contacts 634 to the conductor 291+O extending to Fig. 2 so that the exchange attendant can listen to the busy tone signal after he receives the visual busy signal as described below by actuating the monitor key K1040. This removes the short circuit from the transformer T1060 to include the same in the loop circuit and connects the receiver R1070.

In addition to the foregoing, the relay R630 upon operating under the busy condition noted above, at its contacts 633, will complete the operating circuit for the reversing relay R770. The latter relay in turn, at its contacts 776 to 779, inclusive, reverses the battery and ground potentials applied to the conductors 291+O and 293—O through the windings of the line relays R740 and R760 so that the current flow is reversed through the upper winding of the differential relay R240 in the test distributor trunk circuit 280 and will be in the same direction as the current flow through the lower winding thereof. The relay now operates and, at its contacts 245, connects ground pulses at 60 impulses per minute to the conductor 283L1 extending to Fig. 9 thereby to cause the busy lamp L906 to flash to indicate the busy condition.

It will be assumed, however, that the test connector 160 is idle at the time it is seized by the wipers 601 to 605, inclusive, of the test distributor 600. Consequently, no ground potential is encountered by the wiper 604 so that the busy relay R630 cannot operate. Therefore, the relay R620, due to its slow-to-release characteristics, will remain operated for only a short interval of time after the restoration of the relay R640. A circuit is now completed for operating the relay R610, which includes battery winding of the relay R610, contacts 623, 641, 631 and 732, and ground. The relay R610 upon operating, at its contacts 611, locks itself directly to ground at the contacts 732 so that the restoration of the relay R620 will not open the initial operating circuit at the contacts 623.

As a further result of the operation of relay R610, it disconnects, at its contacts 615, the rotary magnet RM617 to prevent further operation thereof and, at its contacts 614, it connects resistance battery potential in multiple with the winding of the relay R640. At the contacts 618, the switching relay R610 completes a loop circuit for operating the line relay (not shown) in the idle test connector 160. This loop circuit includes the contacts 741 on the operated line relay R740, wipers 603 and 604, conductors 164+O and 165—O in the cable 161 extending to Fig. 1 and the line relay (not shown) in the test connector 160. The test connector 160 now operates and immediately returns a busy marking ground potential on the conductor 166C extending to the wiper 604 to mark the test connector 160 busy.

Finally, at the contacts 616, the switch relay R610 now forwards ground potential over the conductor 167EC to the test connector 160, over a circuit which may best be traced from the conductor 167EC in the cable 161, wiper 605, contacts 616, conductor 303TD extending to Fig. 3, contacts 352, conductor 302T2 extending to Fig. 6, contacts 627, 773', 783 to ground at contacts 781 and 742. This ground potential is forwarded to the test connector 160 and is subsequently applied to the wiper 160C thereon.

The test connector 160 is now in condition to receive the remaining digits 99 of the number 1199 dialed by the exchange attendant. The last two digits 99 dialed by the exchange attendant are transmitted through the test distributor trunk 280 to control the line relays R740 and R760 in the test distributor 600 in the manner previously explained. The line relay R740, at its contacts 741, interrupts the loop circuit to the line relay (not shown) in the test connector 160 whereby the latter connector is controlled in the conventional manner to raise its wipers 160—, 160+ and 160C nine steps in the vertical direction and to rotate these wipers nine steps into engagement with the ninth set of contacts in the selected ninth level in response to the dialing of the last two digits 99.

At the present time, the wipers 160—, 160+ and 160C are in engagement with the contacts 99 terminating the —, + and C conductors individual to the line circuit 100 individual to the line conductors C105 and C106 of the subscriber substation T having the directory number 1199. The ground potential applied to the conductor 167EC by the test distributor 600, is now extended by way of the wiper 160C in the test connector 160 to the C conductor, then by way of the contacts 102 and the winding of the cut-off relay R110, to battery, in the line circuit 100. The cut-off relay R110 now operates to disconnect, at its contacts 111 and 112, the circuit for the line relay R100 thereby to prevent its operation under control of the subscriber at a substation connected to the line conductors C105—C106. The ground potential applied to the C conductor for the purpose of operating the cut-off relay R110 also marks the line circuit 100 busy to all of the local connectors, such as 185, in the exchange to thereby prevent the completion of any telephone connection to the subscriber substation T.

Inasmuch as the test equipment has now been connected with the line of the subscriber at substation T in response to the dialing of the digits 1199, as described above, the exchange attendant may now initiate operations whereby the detector 180 will be associated with the test equipment and operated to register therein the directory number of the line selected by the exchange attendant. If the directory number ascertained by the detector 180 is not the same as that dialed by the exchange attendant, then the operation of the detector 180 is faulty and some action must be taken to correct its faulty operation.

Operating the detector 180

After the exchange attendant has established the above mentioned connection to the line circuit 100 connected to the station T having the directory number 1199, the start key K1010 is actuated. At the contacts 8 on the key K1010, ground potential is extended by way of the normally closed contacts on the test key K1015, contacts 11 on the key K1010, conductor 394-ONG extending to Fig. 3, contacts 342, 332 and 322 in order to operate the start relay R315 in the detector control unit 300. The start relay R315, at its contacts 316, removes a busy marking ground potential from the conductor 383G extending to Fig. 1 and terminating in the bank contacts accessible to the wiper 183 on the register sender finder 181. This conductor is normally grounded to prevent the register sender finder 181 from selecting the test equipment including the detector control unit 300.

The register sender finder 181 is normally controlled over the start conductor 382ST to search for a calling register sender, such as the register sender 130. As a further result of the operation of the start relay R315, at its contacts 317, ground potential is applied to the start conductor 382ST extending to Fig. 1 in order to initiate the operation in the detector 180 whereby the magnet M184 is automatically controlled to search for and find the calling detector control unit 300. It should be noted, however, that during its searching operation, the register sender finder 181 may find another calling register sender, such as 130. In the latter event, the detector 180 will function in its normal manner to identify the directory number of a particular calling subscriber substation and to register the directory number thereof in the associated calling register sender.

After the detection operation is completed, the detector 180 will again control its associated register sender finder 181 until the latter mechanism, through its wipers 182 and 183, connects with the conductors 381H and 383G extending to the detector control unit 300 portion of the testing equipment. This detector control unit 300 is found due to the absence of the marking ground potential on the conductor 383G and when it is found, ground potential applied to the wiper 182 of the register sender finder 181 is extended by way of the conductor 381H extending to Fig. 3, contacts 331 and 341, conductor 382H extending to Fig. 10, contacts 3 on the actuated start key K1010, conductor 384H1 extending to Fig. 3 and the winding of the hold relay R320, to battery. The hold relay R320 now operates under control of the connected detector 180 and immediately interrupts, at its contacts 322, the above described circuit for the start relay R315. The latter relay now restores to normal to remove, at its contacts 317, the starting ground potential from the start conductor 382ST. Also, at its contacts 316, it reapplies the busy marking ground potential to the conductor 383G. However, no action takes place in the detector 180 as a result of the busy marking potential applied to the conductor 383G as long as the detector 180 remains connected to the detector control unit 300 over the conductor 381H.

As a further result of the operation of the hold relay R320, at its contacts 321, it applies ground potential to the conductor 401ATT extending to Fig. 4 in order to operate the connect relay R410. The latter relay is of the multiple contact type and is arranged with sufficient contacts to connect the detector control unit 300 of Figs. 4 and 5 to the detector 180. The connect relay R410 in fact is substantially the same as the corresponding connect relay R170 individually associated with the register sender 130. All register senders, such as 130, are provided with individual connect relays, such as the relay R170, so that any register sender can be individually associated with the detector 180 by the operation of its associated connect relay, such as R170. Also, all of the conductors WXYZ1 to WXYZ5, 171P1 to 171P6, 170EB, 170SB, and 170INC are multiply connected to contacts on all of the connect relays corresponding to the relay R170 and to the connect relay R410 individually associated with the detector control unit 300. Consequently, at the sets of four contacts, designated 411 to 415, inclusive, the WXYZ1 to WXYZ5 code marking conductors are respectively connected to the codesters 531 and 535, inclusive. At the set of three contacts 416, the conductor 385SB is connected to the conductor 170SB extending to the detector 180 which is grounded by the detector 180 whenever it is ready to operate through its detecting cycle and determine the directory number of the particular station on any subscriber line. Also, the conductor 389EB is connected to the conductor 170EB extending to the detector 180 which is ground by the detector 180 whenever the detector satisfactorily completes its detection operation and registers the directory number of the detected station. Also, the conductor 1871NC is connected to the conductor 1701NC extending to the detector 180 which grounds the latter conductor whenever it fails to detect the directory number of a station. At the contacts 417, the connect relay R410 completes an obvious circuit for operating the relay R305. The latter relay, at its contacts 306, prepares a point in the circuit for operating the relay R310 but the latter relay is temporarily short-circuited by the operating ground potential for the relay R305 and the ground potential applied to the conductor 394-ONG by the operated start key K1010. Finally, at the contacts 418 to 423, inclusive, the connect relay R410 prepares points in the circuits including the conductors 171P1 to 171P6 extending to the detector 180 in order to mark the latter unit to indicate whether the station to be detected or identified is an individual station on an individual line or is a station having a certain position on a party line.

The hold relay R320 operates to also connect the detection signal relay R325 to a circuit including the conductor 385SB extending to Fig. 4, then by way of one of the contacts on the contact set 416 to conductor 170SB extending to Fig. 1 so that the relay may be operated as soon as the detector 180 is in condition to perform its detection operation.

Before describing the detection operation of the detector 180, it should be noted that as a further result of the operation of the start key K1010 it completes, at its contacts 1, a circuit including the contact 1 on the key K1020, conductor TU, normally closed contacts of the armature 1 on the key K902, contacts 1 on the key K901, conductor 393TU1 extending to Fig. 3 and the winding of the distributor 1 connect relay R350, to battery. The latter relay now operates and transfers the circuit including the interconnected conductors 302T2 and 303TD by way of the contacts 353 and 354 to the closed contacts 372. Thus, the ground potential applied to the conductor 302T2 by the test distributor 600 is now forwarded over the circuit including the conductors 353, 372 and 354 to the conductor 303TD extending to Fig. 6 to retain the holding ground potential on the conductor 167EC. At the contacts 351, the relay R350 interconnects the conductors 301T1 extending to Fig. 7 and the conductor 390T1 extending to Fig. 10.

Figure 10:
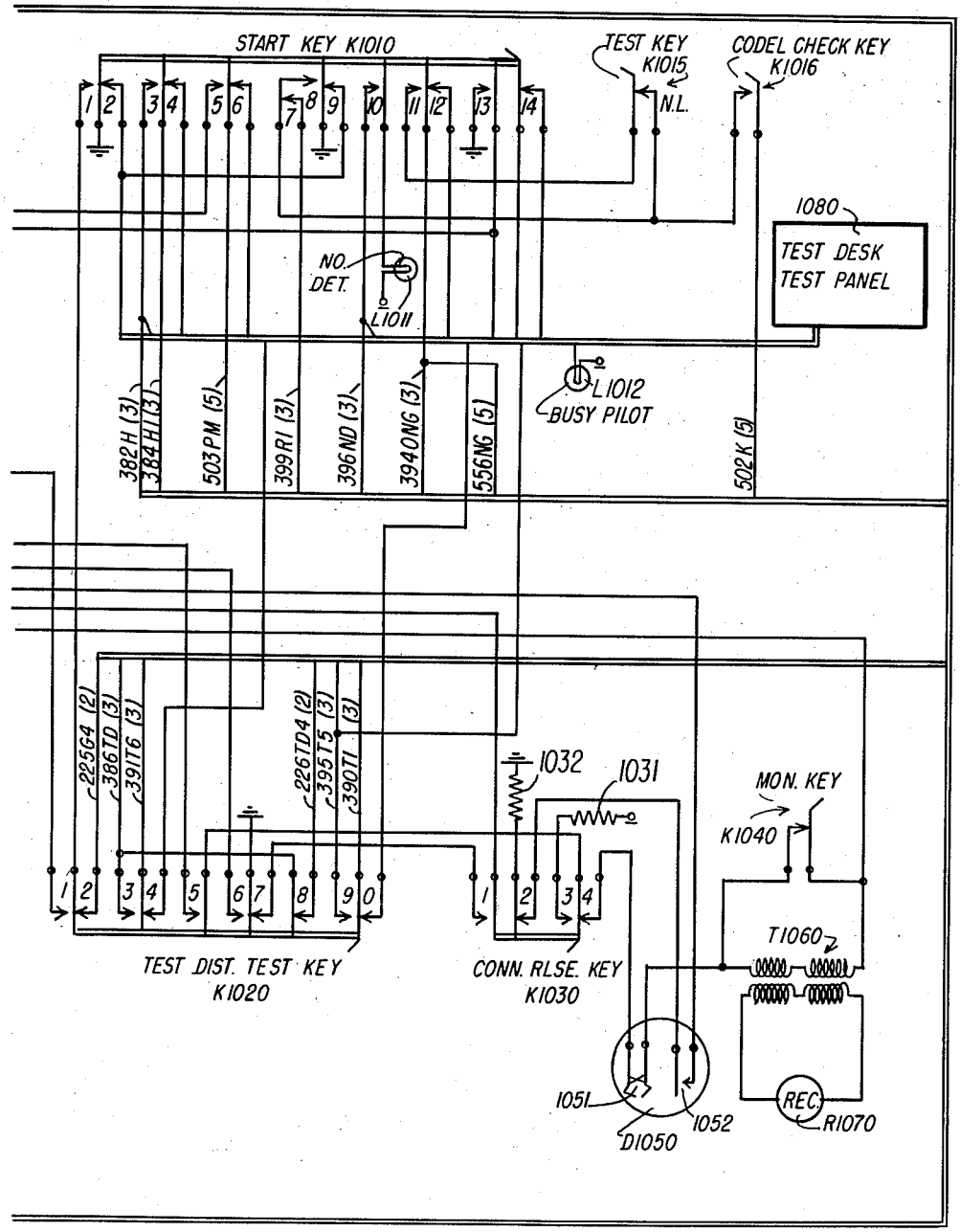

In Fig. 7 it will be seen that the conductor 301T1 is grounded at the contacts 372 on the operated hold relay R730 so that as soon as the contacts 351 are closed, the ground potential is forwarded over the conductor 390T1 extending to Fig. 10, contact 9 on the actuated key K1020, and conductor 395T5 extending to Fig. 3 in order to operate the distributor control relay R370. This relay, at its contacts 373, applies ground potential by way of the contacts 355 on the operated relay R350, conductor 304T3 extending to Fig. 6, wiper 606 in engagement with the contacts 11 in the associated contact bank, the jumper 684, conductor 507DP1 extending to Fig. 5, contacts 562 and 418, conductor 171P1 extending to Fig. 1 to the detector 180 thereby to mark the detector to indicate that the station to be identified is either an individual station on an individual line or a first party substation on a party line.

The operations of the detector 180 whereby the marking is of the position of a station on a party line or an individual station on an individual line controls the detecting cycle is described in detail and claimed in the Ostline Patent No. 2,639,330. Accordingly, it will be assumed that the detector 180 is now conditioned to operate and detect the directory number of the station T having the directory number FLorida 3–1199 and individually associated with the individual line circuit 100. This station, however, could also be the first station on a party line.

As a further result of the operation of the distributor connect relay R370, at its contacts 371, it disconnects the conductor 303TD from the circuit including the ground potential applied to the conductor 302T2 by the test distributor 600 and instead connects it by way of the contacts 371 to the conductor 391T6 extending to Fig. 10, contacts 3 on the key K1020, conductor 386TD1 extending to Fig. 3 and contacts 328, to ground. In view of the foregoing, it will now be understood that the ground potential for retaining the cut-off relay R110 operated in the line circuit 100 is now fed from the contacts 328 on the relay R325.

It will now be assumed that the detector 180 is in condition to operate through its detecting cycle to detect for the directory number of the selected station and, as previously noted, applies ground potential to the conductor 170SB to indicate that it is in condition to operate. The ground potential applied to the conductor 170SB is returned to the now connected detector control unit 300 by way of the conductor 385SB extending to Fig. 3 to complete the circuit for operating the detection signal R325. The latter relay first closes its X contacts 326 to connect the +70 volt booster battery potential 329 by way of the resistors 337 and 336, contacts 326 to the conductor 386TD1 and then over the previously traced circuit to the C conductor over which the cut-off relay R110 is operated. Shortly thereafter, the contacts 327 will be operated to short-circuit the resistor 136 and to apply the +70 volt booster battery 329 through the resistor 337 to the conductor 386TD1. The substitution of the +70 volt booster battery 329 for the direct ground potential applied to the conductor 386TD1 initiates the operation of the director 180 to ascertain and register the directory number of the line marked as calling by the application of the booster battery potential to the "S" conductor individual to the station connected to the line circuit 100. The circuit for applying the booster battery 329 includes the resistor 337, contacts 327, conductor 386TD1 extending to Fig. 10, contacts 3 on the key K1020, conductor 391Td extending to Fig. 3, contacts 371, 354, conductor 303TD extending to Fig. 6, contacts 616, wiper 605, conductor 167EC in the cable 161 extending to Fig. 1, test connector 160, wiper 160C in engagement with the C conductor individual to the line circuit 100, then over one path to retain the cut-off relay R110 in its operated position and over another path including the "S" conductor individual to station T to the detector 180 to control the operation thereof in the manner explained in the Ostline Patent No 2,639,330.

The detector 180 in ascertaining the directory number of the station marked as calling by the application of the booster battery potential 329 thereto, marks its WXYZ1, WXYZ2, WXYZ3, WXYZ4 and WXYZ5 code marking conductors in code form in accordance with the last five digits of the seven digit directory number. In the present example, it has been assumed that the subscriber substation is located in the FLorida 3 exchange and that the digit 3 identifying the particular one of ten possible FLorida exchanges is permanently marked in the detector 180 on the WXYZ1 code marking conductors. The thousands, hundreds, tens and units digits of the numerical portion of the directory number will be marked by the detector 180 on the respective WXYZ2 to WXYZ5, inclusive, code marking conductors in the manner explained in the Ostline Patent No. 2,639,330.

Since these conductors are now connected through the operated connect relay R410 the code marking thereon in accordance with the respective digits 3–1199 corresponding to the last five digits of the directory number FL3–1199 will be registered respectively in the codesters 531 to 535, inclusive, of Figs. 4 and 5. The code marking conductors WXYZ1 to WXYZ5, inclusive, will be marked in code form in accordance with the following code:

| Grounded WXYZ Code Marking Conductors | Operated WXYZ Relays of Codester | Digit Registered |
| --- | --- | --- |
| WX | WX | 1 |
| WY | WY | 2 |
| WZ | WZ | 3 |
| XY | XY | 4 |
| XZ | XZ | 5 |
| YZ | YZ | 6 |
| W | W | 7 |
| X | X | 8 |
| Y | Y | 9 |
| Z | Z | 0 |

Since the digit 3 indicative of the FLorida 3 exchange is marked on the WXYZ1 code marking conductors, the relays W and Z will operate in multiple with each other and in series with the lower winding of the marginal relay R550. The marginal relay R550 is arranged so that it may be energized in series with one of the WXYZ relays, in series with two of the WXYZ relays connected in multiple but in each of the foregoing circuits, the relay R550 does not operate even though the individual or pair of WXYZ marking relays will operate. However, if 3 or 4 of the WXYZ relays are simultaneously energized in multiple with each other and in series with the lower winding of the marginal relay R550, the latter relay will operate with the corresponding WXYZ relays. In other words, the marginal relay R550 will automatically operate over a circuit including its lower winding, if three or four of the WXYZ relays in the codester 531 are controlled for operation over the corresponding WXYZ code marking conductors.

As described above, it will be assumed that the digit 3 is marked in code form in the codester 531 by operating the relays W and Z to indicate the third digit (3) of the FLorida 3 exchange code. As a result thereof, the W relay and the Z relay will lock by way of the respective number 1 X contacts thereon to the conductor 556NG extending to Fig. 10. In Fig. 10, it will be seen that the conductor 556NG is grounded over a circuit including the contacts 11 on the actuated start key K1010, contacts of the test key K1015 and ground at contacts 8 on the start key K1010. As a result of the foregoing, the W and Z relays in the codester 531 will be locked in their operated positions over circuits that are independent of their initial operating circuits. The marginal relay R550, however, will remain in its restored position because only two of the relays (W and Z) in the codester 531 have been operated. The operated W and Z relays in the codester 531 now complete circuits by way of the contacts on the respective relays to certain of the lamps on the lamp panels associated with the exchange attendants control position.

In the above description, it was pointed out that the codester 531 was marked in code form in accordance with the digit 3 corresponding to the third digit of the FLorida 3 exchange code. The detector 180 in completing the detection cycle whereby the above digit has been marked in code form in the codester 531 also marks the code marking conductors WXYZ2 to WXYZ5 in accordance with the code indicative of the respective digits 1199 of the numerical portion of the directory number of the station selected by the exchange attendant. The detector 180 in response to the marking of the foregoing WXYZ2 to WXYZ5 code marking conductors will thereby register the corresponding digits in the codesters 532 to 535, inclusive, of Fig. 4. It should be understood that the last-mentioned codesters are exactly the same as the codester 531.

The cable 501 extending to Fig. 8 from the codester 531 includes the necessary conductors for controlling the illumination of the lamps on the office lamp panel 801 (Fig. 8) and the cables 502 to 505, inclusive, extending from the respective codesters 532 to 535, inclusive, to the lamps on the thousands, hundreds, tens and units lamp panels 802 to 805, inclusive, include the necessary conductors for illuminating the lamps thereon in accordance with the registered digits. The manner in which the various lamps at the exchange attendants lamp panel are controlled will be explained in connection with the operation of the codester 531.

It should be noted that when the start key K1010 was initially operated by the exchange attendant, the ground at contacts 13 thereon is extended to multiple circuits for operating the connect relay R820 and the slow-to-operate control relay R830. Both relays are energized when the contacts 13 on the key K1010 are closed but due to the slow-to-operate characteristics of the connect relay R830, the multiple contact connect relay R820 will operate first to close all of its contact sets 821 to 827, inclusive. Shortly after the operation of the relay R820, the slow-to-operate relay R830 will operate to open, at its contacts 831, a point in the initial operating circuit for the relay R820. However, the latter relay having been operated will now be held in its operated position over the circuit including the resistor 832. It should be noted that the office lamp panel 801 includes twelve lamps numbered 0, 1 to 9, inclusive OV and NO. The OV lamp is indicative of an over-marking of the WXYZ code marking relays in the codester 531. In other words, if more than two of the WXYZ relays in the codester 531 have been operated indicating a faulty condition, the marginal relay R550 will also operate to illuminate the over-marking lamp OV on the office lamp panel 801. Whenever the lamp OV is illuminated, it is an indication to the exchange attendant that the first four lamps designated W0, X1, Y2, X3 should be read in accordance with the letter designation indicative of the corresponding code marking relay instead of being read in accordance with the numerical digit designation.

Since it is assumed that the digit 3 is registered in the codester 531 the lamp Z3 on the office lamp panel 801 should be illuminated at the present time. The circuit for illuminating this lamp may best be traced by first referring to the contacts 343 on the detection complete relay R340. The latter relay is connected in a circuit including battery, the winding of the relay R340, conductor 389EB extending to Fig. 4, one of the contacts on the contact set 416 of the connect relay R410, conductor 170EB extending to Fig. 1 where it is terminated in the detector 180. This conductor will be grounded by the detector 180 when the latter circuit has completed its detection cycle operation in ascertaining the directory number of any station on any line selected by the exchange attendant. Since the detector 180 has completed its detection cycle and has marked its WXYZ1 to WXYZ5, inclusive, code marking conductors in accordance with the last five digits of the directory number of the station T, the conductor 170EB will be grounded at this time to cause the operation of the detection complete relay R340 (Fig. 3). The latter relay, at its contacts 344, immediately locks itself to the grounded conductor 394–ONG extending to Fig. 10.

As a further result of the operation of relay R340, at its contacts 343, it applies ground potential to the conductor 388 extending to Fig. 4, then by way of the contacts 551, contacts 3 on the operated W relay, contacts 4 on the restored X and Y relays, contact 3 on the operated Z relay, conductor 501Z3 in the cable 501 extending to Fig. 8, one of the contacts on the contact set 821 and the lamp Z3 to battery. The lamp Z3 now is illuminated to indicate the digit 3 corresponding to the third digit of the FLorida 3 exchange code. Since the over-marking lamp OV is not illuminated at the present time, the Z marking of the Z3 office lamp 801 may be disregarded. This is the only circuit that is completed through the contacts of the various relays in the codester 531 at the present time.

The codesters 532 to 535, inclusive, will be marked in the same manner as described above in accordance with the last four digits of the numerical portion of the directory number 1199 of station T. The ground potential on the conductor 388 terminating on the armature spring associated with the contacts 531 is multiply connected to each of the other codesters 532 to 535, inclusive, so that this marking ground potential will be applied to the proper marking conductors in the cables 502 to 505, inclusive. Therefore, circuits will be completed in the same manner as has been described above in connection with the codester 531 whereby the lamps on the thousands lamp panel 802, hundreds lamp panel 803, the tens lamp panel 804, and units lamp panel 805 at the attendants position will be illuminated to indicate the respective digits 1199. These lamp panels are also provided with OV and NO lamps corresponding to the panel 801.

The illumination of the party lamps 806 to indicate the position of the station on a party line or whether or not the station detected by the detector 180 is an individual line will now be described. It will be recalled that the exchange attendant in response to the dialing of the last four digits of the directory number of the subscriber caused the test distributor 600 to operate its wipers to a particular bank contact. As a result thereof, ground potential was applied to the wiper 606 in engagement with the associated bank contact 11 to complete a circuit by way of the jumper 648, conductor 507DP1 extending to Fig. 5 and then by way of the contacts 562, 418, conductor 171P1 extending to the detector 180 in order to control the latter unit to automatically indicate to the detector 180 that the station is either an indivadual station on an individual line or a first party substation on a party line. In the above described circuit, it is noted that it included the contacts 562 on the restored party marking relay R560. This relay at the present time is in its restored position. As a result thereof, the ground potential applied to the conductor 507DP1 is extended by way of the contacts 562, conductor 506L1 extending to Fig. 8, one of the contacts of the contact set 826, the P1 lamp of the party lamp panel 806, to battery. This illuminated condition of the P1 lamp will indicate to the exchange attendant that the directory number of the station detected by the detector 180 is that of a first station on a party line or that of an individual station on an individual line. In view of the fact that the exchange attendant has dialed the last four digits of the numerical digits of the directory number which, in this example, are the digits 1199, and these digits have been verified by the illuminated condition of the corresponding lamps in the lamp panels 802 to 805, inclusive, the exchange attendant is able to check the fact that the detector 180 has operated satisfactorily. Also, the detector has illuminated the lamp Z3 in the office lamp panel 801 to indicate that the third digit of the exchange code is the digit 3.

In the foregoing description it was pointed out that the detection complete relay R340 (Fig. 3) operated. This relay also disconnects the detector 180 from the detector control unit 300 and other testing apparatus controlled by the exchange attendant. For example, at the contacts 341, the operated detection complete relay R340 disconnects the conductor 382H extending to Fig. 10, from the conductor 381H extending to Fig. 1. The conductor 381H was grounded by the detector 180 to hold the detector control unit 300 associated therewith by operating the hold relay R320.

Referring now to the hold relay R320 which restored in response to the disconnection of the detector 180 from the detector control unit 300, it will be seen that at its contacts 322, it again prepares a point in the circuit for reoperating the relay R315 but this circuit is not completed at this time due to the operated condition of the detection complete relay R340. As a further result of the restoration of the hold relay R320, at its contacts 321, it removes ground potential from the conductor 401ATT extending to Fig. 4 thereby to restore the connect relay R410 to disconnect the codesters 531 to 535 and other conductors from the detector 180. Also, at its contacts 323, the hold relay now interrupts the circuit for the detector signal relay R325. The latter relay upon restoring to normal, at its contacts 327 and 328, disconnects the +70 volt booster battery 329 from the conductor 386TD1 and instead it connects thereto the direct ground potential at the contacts 328. It will be recalled that the conductor 386TD1 completed the circuit whereby the booster battery potential 329 is applied to the C conductor individual to the line circuit 100 to hold the cut-off relay R110 in its operated position and to control the detector 180 over the "S" conductor individual to the station T so that the detector 180 will identify the corresponding station directory number. The ground potential applied to the conductor 386TD will now hold the cut-off relay R110 in its operated position but it will not effect any operation of the detector 180 over the corresponding "S" conductor.

In the above description it was pointed out that the connect relay R410 restored to normal to disconnect the detector 180 from the director control unit 300 and the other testing equipment. As a result of the restoration of the connect relay R410, at its contacts 417, it removes ground potential from the operating circuit for the relay R305. This relay, in its operated position, locks itself by way of its contacts 306 and the winding of the relay R310 to the grounded conductor 394–ONG. Until the initial operating ground potential is removed from the winding of the relay R305, the relay R310 is short-circuited. However, it now operates and, at its contacts 311, removes ground potential from a common locking circuit including certain of the relays in the trunk access circuit 200. The trunk access circuit 200, however, has not been in operation in connection with the present test of the detector 180.

Over-marking of codesters

If it is now assumed for the purpose of this description that the codester 531 was over-marked due to the fact that the detector caused the operation of three or four of the WXYZ relays, the current flow through the lower winding of the marginal relay R550 would be sufficient to cause the relay to operate. As a result thereof, the ground potential applied to the conductor 388 is now extended by way of the contacts 552, conductor 501-OV in the cable 501 extending to Fig. 8, one of the contacts on the contact set 821, the over-marking lamp OV, and the winding of the fault relay R840, to battery. The lamp OV is illuminated to indicate the over-marking condition described above and the relay R840 operates to complete, at its contacts 841, an obvious circuit for operating the buzzer 850. The buzzer now sounds to indicate to the exchange attendant that a fault condition has occurred in the operation of the detector 180 and the type of fault will be indicated by the illuminated condition of the over-marking lamp OV. Thus, the exchange attendant is informed of a fault and of the type of fault that has occurred.

In addition to the foregoing, the relay R550, at its contacts 553 to 556, inclusive, will attempt to complete circuits through contacts of the respective WXYZ relays in the codester 531 in order to mark respectively the conductors 501W0, 501X1, 501Y2 and 501Z3 in the cable 501 extending to Fig. 8. These conductors are connected respectively to the W0, X1, Y2 and Z3 lamps of the office lamp panel 801. Normally, any one of the foregoing lamps may be illuminated to indicate any one of the digits 0, 1, 2 or 3. However, due to the illuminated condition of the over-mark lamp OV, the exchange attendant will thereby be informed to read the above mentioned lamps in accordance with the letter designation instead of by its numerical designation. The letter designation of the lamp indicates to the exchange attendant the designation of the particular relay in the codester 531 that has been operated by a corresponding marking potential applied to the WXYZ1 conductors by the detector 180. The record of the fault will be made by the exchange attendant so that steps can be immediately taken to correct the faulty operation of the detector 180.

It should be noted that the codesters 532 to 535, inclusive, are arranged in exactly the same manner as the codester 531 and that the corresponding lamp panels 802 to 805 may be controlled in a similar manner whenever three or four of the WXYZ marking relays in the corresponding codesters have been operated.

The marginal relay R550 is arranged with an upper winding which may be selectively controlled by operating the codel check key K1016 (Fig. 10). As pointed out previously, the marginal relay R550 is not operated when one or two code marking relays in the codester 531 is operated. If the exchange attendant would like to know what relays are operated instead of observing the lamp panel to find out the digit stored by the operated relays, the codel check key K1016 may be operated. This key is included in the circuit that may be traced from ground at the contacts 8 on the start key K1010, contacts on the codel check key K1016, conductor 502K extending to Fig. 5, and the upper winding of the marginal relay R550 and the corresponding relays in each of the codesters 532 to 535, inclusive. The relay R550 will operate to perform the same controls described above, giving the designations of the operated relays on the W0, X1, Y2 and Z3 lamps on the office lamp panel 801 and the over-mark lamp OV will be illuminated to indicate the fact that the letter designation of the lamp should be read instead of the numerical designation. The same operation will occur in each of the codesters and corresponding lamp panels. The restoration of the key K1016 will restore the marginal relay R550 and the corresponding relays to normal in the codesters 531 to 535, inclusive.

From the foregoing description, it will be understood that the exchange attendant by means of the test distributor detect key K901, the test distributor test key K1020 and the start key K1010, is able to dial the necessary digits to the test distributor trunk 280, the test distributor 600 and the test connector 160 to connect with the terminals of a particular line circuit terminating a particular subscriber substation, or stations on a particular party line. In addition to the foregoing, the exchange attendant is able to connect the detector 180 with the detector control unit 300 to cause the operation of the detector 180 to find and identify the directory number of the station terminating the line circuit selected by the test connector 160. If the detector 180 operated satisfactorily during this test operation, the number of the station terminating the selected line circuit will be registered in the various codesters 531 to 535, inclusive, to control the lamps on the lamp panels 801 to 805, inclusive, so that the exchange attendant can verify the satisfactory operation of the detector 180.

It is conventional practice in the usual test switch train including the test distributor 280, test distributor 600 and the test connector 160 to selectively control the test connector 160 to advance its wipers one step at a time over the bank contacts in any selected level by merely actuating the calling device D1050 to transmit a single impulse. It is also conventional practice to control the test switch train mentioned above to release the test connector, such as 160, from any selected level after it has been selectively operated over the ten contacts of any selected level and then reoperate the same to the next level where successive tests may be made of each of the ten contacts in the newly selected level. It will be appreciated that by this means, the exchange attendant is able to selectively control the detector 180 in the manner previously described so that it will perform its normal operating cycle in connection with each subscriber line selected by the test connector 160 and cause the lamps at the exchange attendant's position to indicate the directory number of the station on the selected line.

In the previous description of the operation of equipment, it was pointed out that the detect complete relay R340 operated as a result of the complete operation of the detector 180 and the relay locked itself to the grounded conductor 394-ONG. The operated detection complete relay R340 caused the release of the detector 180 so that it is usable in normal operation by regular calling subscribers in the exchange. If the exchange attendant should now desire to move the wipers of the test connector an additional step from engaged contacts 99 (the assumed position of the wipers on the test connector 160) it will be necessary for the exchange attendant to first release the test connector and then reoperate the wipers to any desired level. This may be done by first momentarily actuating the test key K1015 which will interrupt a point in the circuit from ground at contacts 8 on the start key K1010, contacts of the test key K1015, contacts 11 on the start key K1010 and the conductor 394-ONG extending to Fig. 3. In Fig. 3 the removal of ground potential at conductor 394-ONG will cause the restoration of the detection complete relay R340 and it will cause the control relays R305 and R310 to restore to normal. Also, this ground potential will be removed from the conductor 556NG extending to Fig. 5 in order to interrupt the operating circuits for all operated ones of the WXYZ relays in the codesters 531 to 535, inclusive.

The exchange attendant may now release the test connector 160 from the terminals 99 terminating the line circuit 100 of the substation 1199 by momentarily operating the connector release key K1030. At the contacts 3 of the key K1030, battery potential through the resistor 1030 is connected by way of the contacts 5 on the key K1020, conductor T, normally closed contacts on the armature 4 on the key K902, contacts 4 on the key K901 and conductor 281T extending to Fig. 2. Also, at the contacts 4 of the connector release key K1030, the previously traced circuit for the conductor R extending to the conductor 282R in Fig. 9 is opened. Finally, at the contacts 2, the connector release key K1030 removes resistance ground potential from the circuit including the conductor 284S in Fig. 9 thereby to release the control relay R230 in the test distributor trunk 280. The release of the relay R230 connects the conductor 281T by way of the contacts 233 to the conductor 291+O extending to Fig. 7, then by way of the contacts 777 and the winding of the line relay R760 to ground in order to hold the latter relay in its operated position. At the contacts 235, the relay R230 in the test distributor trunk 280 connects the conductor 282R by way of the contacts 235, 243, 253 and 261 to the conductor 293—O extending to Fig. 7, then by way of the contacts 779 and the winding of the line relay R740, to battery.

In the test distributor 600, the release of the line relay R740, while retaining the line relay R760 in its operated position causes the relay R740 to interrupt, at its contacts 741, the loop circuit extending by way of the wipers 603 and 604 to the test connector 160 over the previously described circuit. The test connector 160 now restores to normal in a conventional manner.

The exchange attendant may now restore the connector release key K1030 to its illustrated unoperated position and thereby cause the operation of the control relay R230 in the test distributor trunk 280 and the operation of the line relay R740 in the test distributor 600 all in the manner previously described. As a result of the reoperation of the line relay R740, the above described loop circuit, including the contacts 741, will be completed for reoperating the line relay (not shown) in the test connector 160. The exchange attendant may now manipulate the dial D1050 in the manner described hereinbefore in accordance with the last two digits of any desired line number in the 1100 group (selected by the test distributor 600) so that the test connector 160 will raise its wipers to the desired level and then rotate its wipers over the contacts in the selected level a number of steps corresponding to the last of the two dialed digits. Thus, the wipers of the test connector will be moved to the terminals of another subscriber line.

As soon as the operator restores the momentarily operated test key K1015, as mentioned above, the ground potential will be reapplied to the conductor 394–ONG to complete the previously described circuit for the start relay R315. Consequently, the detector 180 is reconnected to the detector control unit 300 and automatically controls the codesters 531 to 535, inclusive, to cause the lamp panels 801 to 805, inclusive, to be illuminated to indicate the directory number of the station on the line selected by the test connector 160. Thus, the detector 180 is tested to determine its operation with regard to finding the directory number of a station on the line selected by the test connector 160.

In the foregoing operations, it has been assumed that the test connector 160 may be restored and reoperated without releasing the test distributor 600 and other apparatus utilized in establishing the original connection with the test connector 160. It will also be apparent that the entire connection may be released by merely restoring the test distributor detect key K901, the test distributor test key K1020 and the start key K1010. This will cause all of the apparatus involved in any testing operation to restore to normal.

*Failure of the detector 180*

In order to describe the operations which result because the detector 180 fails to detect a line selected by test connector 160, it will be assumed that the operations are completed in exactly the same manner as described hereinbefore. However, the normal operation of the detector 180 is such that upon its completion of a detection cycle, it applies ground potential to the conductor 170EB thereby to ground the conductor 189EB extending to Fig. 3 and cause the operation of the detection complete relay R340. If the detector 180 should fail to detect a line selected by the connector 160 within a predetermined elapsed time interval, it will instead apply a ground potential to the conductor 170INC. In Fig. 4, the conductor 170INC is connected by way of one of the contacts on the contact set 416 to the conductor 387INC extending to Fig. 3 to complete an obvious circuit for operating the incomplete detection relay R330. At its X contacts 334, the relay R330 immediately locks itself over a circuit including its right-hand winding and the grounded conductor 394–ONG.

As a further result of the operation of relay R330, at its contacts 333, it connects the ground potential on the conductor 394–ONG to the conductor 396ND extending to Fig. 10, then by way of the contacts 10 on the actuated key K1010 to illuminate the no detection lamp L1011. Illumination of this lamp will indicate to the exchange attendant that the detector 180 failed in its operation and, therefore, was unable to ascertain the directory number of the station connected to the line selected by the test connector 160. As a further result of the operation of relay R330, at its contacts 331, it interrupts a point in the previously traced circuit including the conductors 381H and 382H in order to disconnect the detector 180 from the detector control unit 300. Finally, at its contacts 335, the relay R330 applies ground potential to the conductor 388 extending to Fig. 5.

In Fig. 5, the ground potential on the conductor 388 is now extended by way of the contacts 551, contacts 4, 6, 8 and 6 on the respective unoperated WXYZ relays in the codester 531, conductor 501N0 in the cable 501 extending to Fig. 8, one of the contacts on the contact set 821 of the operated connect relay R820, the lamp NO on the office lamp panel 801, and the winding of the fault relay R840, to battery. The same circuit, including the ground potential on the conductor 388 will be completed by way of unoperated contacts on the WXYZ relays in each of the codesters 532 to 535, inclusive, to illuminate the corresponding NO lamp on the thousands, hundreds, tens and units lamp panels 802 to 805, inclusive, and to operate the fault relay R840. The relay R840, at its contacts 841, will cause the buzzer 850 to sound and thereby indicate to the exchange attendant that the fault condition exists. It should be noted, however, that the fault condition exists. It should be noted, however, that if the detector 180 in its operation has been able to mark any of the code marking conductors WXYZ1 to WXYZ5, inclusive, in accordance with any of the digits of the directory number of the line under test, then the corresponding relays in the codesters 531 to 535, inclusive, will be operated to illuminate corresponding lamps in the lamp panels 801 to 805, inclusive, instead of the NO lamp in the corresponding panels. Normally, however, the NO lamps in each of the lamp panels will be illuminated when the detector fails to identify the directory number of the line under test.

In the above described circuit for operating the incomplete detection relay R330, it is noted that the ground potential on the conductor 387INC (applied thereto in response to the incomplete operation of the detector 180) is extended by way of the conductor 398NDM to Fig. 6 where it completes the circuit for operating the test relay R690. The latter relay is connected in parallel with the incomplete detection relay R330 provided in the detector control unit 300 and it will control the detector supervisory circuit 695, schematically illustrated in the lower portion of Fig. 6 in order to block-out the alarm condition normally transmitted whenever an incomplete detection operation occurs in the detector 180. In the detector supervisory circuit 695, the incomplete relay R675 is connected to a circuit including the contacts 672 on a normally operated relay R670 to the conductor 693INC extending to Fig. 4. This conductor is multiply connected with the conductor 170INC extending to the detector 180 and will be grounded whenever an incomplete detection condition is encountered by the detector 180.

During the normal operation of the detector 180 in finding a directory number of a calling subscriber substation, the detector control unit 300 is disconnected because the connect relay R410 thereof is in its normal position. Therefore, the grounding of the conductor 170INC, as a result of the incomplete detection of the detector 180, will complete a circuit by way of the conductor 693INC extending to Fig. 6, and contacts 672 in order to operate the incomplete relay R675. The latter relay, at its contacts 676, completes a circuit by way of the contacts 681 on the normally operated relay R680, to operate the no detection alarm relay R685. The latter relay, at its contacts 686, locks itself by way of the contacts 691 to the release key K692. At the contacts 687, the relay R685 completes the circuit for illuminating the no detection lamp L694. This lamp signal notifies the exchange attendant of the failure of the detector 180 during its normal detection cycle.

In the event that the detector 180 fails to detect the directory number of a station on the line selected by the test connector 160 during the testing operation controlled by the exchange attendant, the above described circuit for controlling the operation of the no detection alarm relay R685 will be completed in the usual manner.

In addition to the foregoing, however, the no detection relay R330 in the detector control unit 300 is operated and locked in the manner described above. Also, the conductor 398NDM extending to Fig. 6 is grounded at this time to cause the test relay R690 to operate. At the contacts 691, the slow-to-release test relay R690 opens the locking circuit for the no detection alarm relay R685 to permit the latter relay to automatically restore and remove the alarm condition on the lamp L694. More specifically, inasmuch as the exchange attendant has initiated the operation of the detector 180 to test the same in conjunction with the detector control unit 300, there is no need for the automatic alarm condition to be brought in by the relay R685 in the detector supervisory circuit 695. This alarm condition is only required when the exchange attendant is not aware of the fact that the detector 180 is being used in a normal operating cycle to detect the directory number of a calling subscriber substation.

The locked-in condition of the incomplete detection relay R330 and the other apparatus involved in controlling the detector 180 may be released by restoring the various keys K901, K1010 and K1020 at the exchange attendant's position.

*Party line detection*

In the above description of the operation of the testing apparatus to ascertain the corrections of the operation of the detector 180, it was assumed that the exchange attendant dialed the test distributor 600 and the test connector 160 in accordance with the digits 1199 of the numerical portion of the directory number of the subscriber at substation T. The detector 180 was automatically controlled to find the directory number of this station in accordance with the application of the +70 volt booster battery 329 to the "S" conductor individual to the line circuit 100. Instead of an individual line, such as the line C105—C106 terminating the individual station T, the line C105—C106 may instead terminate as many as six different substations having respectively the numbers 1199, 1299, 1399, 1499, 1599 and 1699 constituting the numerical portions of the directory numbers of the respective stations. Under this condition, the +, — and C conductors extending to the contact banks of the local connectors 185 are multiply connected to individual terminals in the bank contacts accessible to six different hundreds groups of local connectors, namely, the 1100 to 1600 groups of connectors. Thus, each station would be terminated on a terminal-per-station basis in the banks of the local connectors.

It has been assumed that the test connector 160 is a regular hundred line test connector having access to 100 terminals. It is also assumed that this test connector will test the stations having directory numbers in the 1100 group of numbers. At least five additional test connectors are required to test each of the remaining hundreds groups terminating the other five stations on the party line. With this arrangement, the "S" conductor individual to the line circuit 100 terminating the party line will be multiply connected in the detector 180 so that it will appear therein in each of the six different hundreds groups noted above. The +70 volt booster battery potential 329, which is connected to the C conductor over the test switch train will accordingly appear on the "S" conductor in each of the hundreds groups 1100 to 1600 provided in the detector 180. This will occur when any test connector, such as 160, individual to any one of the hundreds groups has been operated to connect with the line circuit 100. However, the test distributor 600 under such conditions will be operated in accordance with the first and second digits to the terminals 11, 12, 13, 14, 15 or 16 in the associated banks accessible to the wipers 601 to 606, inclusive, and the wiper 606 will apply ground potential to the conductors 507DP1 to 507DP6, inclusive, depending upon the hundreds group selected by the test distributor 600. Thus, the particular party marking conductors 171P1 to 171P6, inclusive, will be marked with ground potential depending upon the position that the test distributor 600 has been operated in response to the first two digits of the numerical portion of the four digits dialed by the exchange attendant.

In the detector 180, the grounding of one of the party conductors 171P1 to 171P6 will cause the detector 180 to be effectively controlled by the +70 volt booster battery potential 329 in only the hundreds group corresponding to the particular group selected by the test distributor 600. If the detector 180 satisfactorily operates, then the codesters 531 to 535, inclusive, will be controlled in the manner previously explained so that the lamp panels 801 to 805, inclusive, will be illuminated to indicate the exchange digit as well as the numerical digits included in the directory number of the particular station on the party line. In addition to the foregoing, one of the party lamps on the panel 806 will be illuminated to indicate the position of the particular station on the line selected by the exchange attendant.

There is a novel arrangement, however, that should be considered which permits the exchange attendant to control the detector 180 to mark the positions of the different stations on a party line when any one of the test directors, for example 160, is connected to the line circuit individual to the party line. If it is assumed that the exchange attendant has caused the operation of the test distributor trunk 230, the test distributor 600, and the test connector 160 in the manner previously described to connect with the —, + and C conductors extending to the line circuit 100 by merely dialing the digits 1199, the detector 180 may be controlled automatically to connect with the detector control unit 300 by merely actuating the start key K1010. Under these conditions, the test distributor 600, at the wiper 606, will apply ground potential to the conductor 507DP1 extending to Fig. 5 thereby to mark the party conductor 171P1 so that the detector 180 will search for the party station directory number in the 1100 group. After the detector has completed its detection operation and has caused the codesters 531 to 535, inclusive, to be operated in accordance with the respective digits 3–1199 of the first station on the party line the corresponding lamps on the lamp panels 801 to 805, inclusive, will also be illuminated all in the manner previously explained.

In addition to the foregoing, the P1 lamp on the party lamp panel 806 will also be illuminated over the circuit including the conductor 506L1 extending to Fig. 5 and the ground potential applied thereto through the contacts 562 and the conductor 507DP1.

The completion of the detection cycle by the detector 180 causes the operation of the detection complete relay R340 whereby the detector 180 is disconnected from the detector control unit 300 by restoring the connect relay R410.

Since the exchange attendant has now controlled the detector 180 to test its operation in ascertaining the number of the first station on a party line selected by the test connector 160, the attendant can now reoperate the detector 180 to ascertain whether or not it can identify the second station on the party line without reoperating the test connector 160 or the test distributor 600. This may be done by first actuating the test key K1015 to remove the ground potential, at the contacts 8 on the key K1010 from the circuit including the contacts 11 on the key K1010 and the conductor 394–ONG extending to Fig. 3.

The removal of the ground potential from this circuit causes the detection complete relay R340 to restore to normal and it also restores the relays R305 and R310 which are normally locked to this conductor when the detection complete relay R340 is first operated. The removal of the ground potential from the conductor 556NG by the opening of the contacts on the test key K1015 permits all of the operated WXYZ relays in the codesters 531 to 535, inclusive, to restore to normal so that they may be subsequently reoperated.

The test key K1015 may now be restored to normal to reapply ground potential to the conductor 394–ONG extending to Fig. 3 in order now to reoperate the start relay R315. This relay, at its contacts 317, will again cause the register sender finder 181 to reconnect the detector 180 to the detector control unit 300 associated with the exchange attendant's testing position. Also, the exchange attendant may now operate the party 2 key of the party marking keys K903 (Fig. 9) since the attendant wants to check the operation of the detector 180 to see if it will detect the directory number of the second station on the party line and light the corresponding lamps on the lamp panels 801 to 805, inclusive.

At the contacts 2 on the party 2 key K903, ground potential, at the contacts 13 on the key K1010, is extended by way of the contacts 5 on the key K1010, and conductor 503PM extending to Fig. 5 in order to operate the party marking relay R560. This relay, at its contacts 562, 564, 566, 568, 570 and 572 disconnects the various conductors 507DP1 to 507DP6 from the party marking conductors 171P1 to 171P6, inclusive, extending to the detector 180. Consequently, whatever party marking is applied to the conductors 507DP1 to 507DP6, inclusive, by the wiper 606 on the test distributor 600 becomes ineffective. At the contacts 561, 563, 565, 567, 569 and 571, the relay R560 connects the conductors 505P1 to 505P6, to the respective party conductors 171P1 to 171P6. The operation of the party 2 key of the party marking keys K903 now completes, at the contacts 1 thereof, a circuit including one of the contacts on the contact set 827 of the operated connect relay R810, conductor 505P2 extending to Fig. 5, contacts 563 on the operated party marking relay R560, contacts 419 on the operated connect relay R410, conductor 171P2 extending to the Fig. 1 to now mark the detector 180 to search for the directory number of the second station on the party line connected to the line circuit 100. The numerical portion of the directory number of this station is assumed to be 1299.

When the detector 180 is connected to the detector control unit 300 through the register sender finder 181 in the manner previously described, the detector signal relay R325 operates to transmit the +70 volt booster battery 329 over the connection including the conductor 386TD1 extending to Fig. 10, contacts 3 on the operated key K1020, conductor 391T6 extending to Fig. 3, contacts 371 and 354, conductor 303TD extending to Fig. 6, contacts 616, wiper 605, in engagement with the bank contact 12, conductor 167EC in the cable 161 extending to the test connector 160 (Fig. 1), wiper 160C in engagement with the bank contacts 99 in the associated contact bank terminating the C conductor individual to the line circuit 100 so that the booster battery will now be extended over all the "S" conductors in the detector 180 that individually corresponds to the directory numbers 1199, 1299, 1399, 1499, 1599 and 1699 of the individual stations on the party line.

Inasmuch as the detector 180 has been controlled by the party marking on the conductor 171P2, the booster battery potential will be effective in only the 1200 group of line therein, corresponding to second stations on party lines. The numerical portion of the directory number 1299 will be detected by the detector 180 if it is operating satisfactorily. This number, together with the office number, will be registered in the codesters 531 to 535, inclusive, and illuminated in the lamp panels 801 to 805, inclusive. The P2 lamp on the party lamp panel 806, will also be illuminated over the circuit including the conductor 506L2 extending to Fig. 5, contacts 563 and the conductor 505P2 that has been grounded by the actuation of the party 2 marking key K903.

It is apparent from the foregoing description that the exchange attendant may again operate the test key K1015 to release the detector control unit 300 and then operate the party 3 marking key K903 so that the detector 180 is again controlled, without reoperating the test connector 160, to now test for the directory number 1399 of the third station on the party line connected to the line circuit 100. Each station on a line may thereby be arbitrarily selected by the exchange attendant to cause the detector 180 to operate through its detecting cycle and thereby ascertain the correct operation of the detector 180 to search for the directory number to any station on any party line and any individual station on any individual line.

In the foregoing description, the operation for controlling the detector 180 to detect any of the party station directory numbers on a selected party line was initiated without reoperating the test connector 160 for each test. It is obvious, however, that the exchange attendant by selectively controlling the dialing mechanism D1050 may operate the test distributor trunk 280, the test distributor 600, and test connectors, such as 160, six different times to select each of the six different stations on the party line.

*Unit 2 test distributor detector key K902*

In the previous description of the operation of the testing equipment, it was pointed out that the test distributor detect key K901 is operated to select the test trunk 280, test distributor 600 and various test connectors, such as 160, accessible thereto, to control the operation of the detector 180. The foregoing apparatus involves the testing of the detector 180 in connection with subscriber lines terminating in, for example, the FLorida 3 exchange. A test may also be made of another office or exchange unit, for example, the FLorida 2 exchange, by actuating the unit 2 test distributor detect key K902 instead of the key K901. This key, at its various contacts, transfers the conductors in the cable C907 from the unit 1 test distributor detect key K901 to the unit 2 test distributor trunk 280A which may, for example, be exactly the same as the test distributor trunk 280 illustrated in Fig. 2. The unit 2 test distributor trunk 280A is accordingly illustrated in block diagram form and it should be understood that it has access to a test distributor, such as the test distributor 600, and the latter distributor has access to the usual test connectors corresponding to the test connector 160, which in turn have access to subscriber substations terminating in the FLorida 2 exchange equipment. The operation of the test distributor and test connector and other equipment to check the operation of the detector to detect the directory numbers of stations in the FLorida 2 exchange is exactly the same as has been described above. It should be noted, however, that at the make contact associated with the armature 1 on the key K902 a circuit will be completed by way of the conductor 392TU2 extending to Fig. 3 in order to operate the distributor 2 connect relay R360 instead of the relay R350. This relay, at its various contacts, completes circuits including the test distributor (not shown) accessible to the unit 2 test distributor trunk 280A by way of the cable C366 in the same manner as the distributor 1 connect relay R350 completes circuits for the test distributor 600. Other operations for controlling the detector to test the operation thereof are exactly the same as has been described hereinbefore.

*Permanent signal holding bridge circuit 135*

In the previously mentioned Newstedt application, complete circuit description is given of the operation of the register sender therein to route a call initiated by a subscriber, to an intercept operator position if the calling subscriber line has a false ground condition thereon that would interfere with the completion of the toll call to its destination. If such a call is automatically routed to the intercept operator position, the operator thereat may ascertain from the calling station the directory number thereof so that the necessary action may be taken to remove the faulty ground potential from the subscriber line. In the present system, it is contemplated that when a false ground condition is encountered on a calling line, the register sender 130 automatically operates in the manner described in the above mentioned Newstedt application to route the call, for example, by way of the primary selector 120 to an idle one of a plurality of permanent signal holding circuits, such as the circuit 135, instead of to an intercept operator position.

After the connection is thus routed, the register sender 130 drops out of the connection so that a calling subscriber loop circuit will now be completed, for example, from the substation T over the line conductors C105—C106, wipers 116 and 117 of the finder 115, then through the primary selector 120 to the wipers 121 and 122, and the windings of the relay R150 in the permanent signal holding circuit 135. The relay R150 operates over this circuit and, at its contacts 151, completes the circuit for operating the slow-to-release relay R140. The latter relay, at its contacts 143, returns a busy and holding ground potential by way of a circuit including the contacts 214, wiper 123, through the primary selector 120, finder 115, wiper 118, contacts 113 and the winding of the operated cut-off relay R110, to battery. This ground potential is also extended by way of the contacts 102 in the line circuit 100 to the C conductor terminating in all of the bank contacts of the local connectors, such as 185, and test connectors, such as 160, having access to the line circuit 100, in order to mark the same busy.

As a further result of the operation of relay R140, at its contacts 144, it completes an obvious circuit for illuminating the lamp L203 in the trunk access circuit 200. Also, at the contacts 141, the relay R140 transmits a busy tone signal back to the calling subscriber to indicate that his call encountered a busy condition.

The illuminated condition of the lamp L203 will indicate to the exchange attendant that a call has been routed to the permanent signal holding circuit 135 instead of the desired destination. If it is necessary to check the calling line to determine the condition thereon that caused the routing of the call to the circuit 135, the exchange attendant must actuate the key K201 associated with the illuminated lamp L203 in the trunk access circuit 200 and also the start key K1010 at the attendant's position.

As a result of the actuation of keys K201 and K1010, a circuit is completed from the winding of the trunk access relay R210, contacts of the key K201, conductor 225G4 extending to Fig. 10, contacts 2 on the restored key K1020 and contacts 1, to ground, on the operated start key K1010. The start key K1010 is of the locking type and will remain in its actuated position until it is restored by the exchange attendant, whereas the key K201 in the trunk access circuit 200 is of the non-locking type and will immediately restore to normal as soon as the exchange attendant releases it. However, the relay R210 is now locked over a circuit including its X contacts 212, to ground at the contacts 311 on the relay R310 in the detector control unit 300 of Fig. 3. At the contacts 211, the relay R210 completes an obvious circuit for illuminating the trunk access pilot light lamp L205 to indicate to the exchange attendant that the trunk access relay R210 has been locked-in as a result of the call routed to the permanent signal holding circuit 135. As a further result of the operation of relay R210, at its contacts 214, it disconnects the holding ground potential, at the contacts 143 from the wiper 123 of the primary selector 120 and instead substitutes the holding ground thereon over a circuit including the contacts 213 and the conductor 226TD4 extending to Fig. 10, contacts 8 on the key K1020, conductor 386TD1 extending to Fig. 3, and contacts 328 to ground. Consequently, the ground potential applied to the wiper 123 will hold the primary selector 120, the finder 115 and the cut-off relay R110 in the line circuit 100 in the operated positions, and it will maintain the busy marking potential on the C conductor extending to the bank contacts accessible to the test connectors, such as 160, and the local connectors, such as 185.

The subscriber, at the substation T or any other station on the line that has initiated the above intercepted call, will normally release the connection upon hearing the busy tone signal. If the subscriber should release the connection by replacing the receiver on the switch-hook of the telephone instrument at the station, the loop circuit including the line conductors C105 and C106 will be interrupted thereby to cause the restoration of the relay R150 in the permanent holding circuit 135. The latter relay, at its contacts 151, will interrupt the circuit for the slow-to-release relay R140 and the latter relay upon restoring will interrupt the previously traced circuit including the contacts 141 and 143. Finally, at the contacts 144, the relay R140 will extinguish the lamp L203 individual to the permanent signal holding circuit 135 thereby to indicate to the exchange attendant that the subscriber released the connection.

In the event the ground potential at the contacts 143, is removed from the circuit including the contacts 214 and the wiper 123, before the trunk access relay R210 is operated, then the primary selector 120, finder 115 and the cut-off relay R110 will restore to normal and prevent exchange attendant from ascertaining the directory number of any one or more of the stations connected to the calling line. Since the relay R210 is operated, however, the holding ground potential on the conductor 226TD4 is retained on the wiper 123 to hold the above named apparatus in an operated position after the subscriber disconnects his substation from the associated line.

At the time the exchange attendant operated the start key K1010, as noted above, ground potential at the contacts 8 is extended over a circuit including the test key K1015, contacts 11 on the key K1010, conductor 394—ONG extending to Fig. 3, contacts 342, 332 and 322 to operate the start relay R315. The latter relay, as described hereinbefore, controls the detector 180 and its associated register sender finder 181 to associate the detector 180 with the exchange attendant's testing equipment, including the detector control unit 300. As soon as the detector 180 is associated with the director control unit 300, the circuit will be recompleted for the hold relay R320 and the detection signal relay R325 will be operated to substitute the +70 volt booster battery 329 at the contacts 327 for the direct ground potential at the contacts 328 on the conductor 386TD1. Therefore, the booster battery potential will be returned over the previously traced circuit to the wiper 123 on the primary selector 120, then through the finder 115 to the wiper 118, contacts 113 and the winding of the cut-off relay R110 to battery to hold the latter relay in its operated position. Also, this booster battery potential is now further extended by way of the contacts 102 to the C conductor individual to the line circuit 100 and to the "S" conductor individual thereto extending to the detector 180. The booster battery potential applied to the "S" conductor will control the detector 180 in the manner described in the Ostline Patent No. 2,639,330.

Since the exchange attendant does not know whether the station that had its call routed to the permanent holding signal 135 is a station on a party line or an individual station on an individual line, the party 1 key of the party marking keys K903 will be actuated. This simulates a condition corresponding to a call by a first substation on a party line or a station on an individual line. Therefore, at the time the start key K1010 is operated to apply the ground potential at the contacts 13 to the circuit for operating the connect relays R820 and R830, the contacts 2 on the party 1 key of the keys K903 is closed to further extend the ground potential by way of the contacts 5 on the key K1010, and conductor 503PM extending to Fig. 5 in order to operate the party marking relay R560. Also, the contacts 1 on the party 1 key of the marking keys K903 further extends the ground potential by way of one of the contacts on the contact set 827, conductor 505P1 extending to Fig. 5, contacts 561 on the now operated relays R560, conductor 506L1 extending to Fig. 8, one of the contacts on the contact set 826, the P1 lamp of the party lamp panel 806, to battery, to illuminate the P1 lamp. Also, the ground potential on the conductor 505P1 is further extended by way of the contacts 561, contacts 418 on the operated connect relay R410, conductor 171P1 extending to Fig. 1 and the detector 180 in order to mark the latter unit to respond for the directory number of the station of the first party on the line if the locked-in line is a party line or the station of an individual party if the locked-in line is an individual line. Consequently, the detector 180 operates in a conventional manner described in the Ostline Patent No. 2,639,330 to register the last five digits of the seven digit directory number of the station in the codesters 531 and 535, inclusive, in the manner described in detail hereinbefore. These codesters will control the illumination of the lamps on lamp panels 801 to 805, inclusive, so that the exchange attendant will be informed as to the identity of at least one station on a party line that was involved in the connection routed automatically by the register sender 130 to the permanent signal holding circuit 135. Having ascertained the directory number of at least one of the stations on the line that has a faulty ground potential thereon, the exchange attendant may now make a record thereof so that proper steps may be taken to have the faulty ground condition removed from the line in question.

When the detector 180 has completed its operation and has marked the various codesters 531 to 535, inclusive, in accordance with the last five digits of a first station on a party line or the last five digits of the directory number of an individual station on an individual line, it will then apply ground potential to the conductor 389EB to cause the operation of the detection complete relay R340 as described hereinbefore. At the contacts 323, the relay R340 upon restoring to normal, interrupts the circuit for the detection signal R325 which restores to normal to replace the booster battery potential on the conductor 386TD1 with the direct ground potential at the contacts 328. This will hold the primary selector 120, finder 115 and cut-off relay R110 in their operated positions until the trunk access relay R210 is subsequently restored to normal.

The relay R340 will, at its contacts 341, interrupt points in the previously traced circuit including the conductors 381H and 382H to release the detector 180 from the exchange attendant's testing equipment, including the detector control unit 300. As a result thereof, the hold relay R320 restores to normal to remove, at its contacts 321, the ground potential from the conductor 401ATT extending to Fig. 4 to restore the connect relay R410 and thereby disconnect the codesters 531 to 535, inclusive, from the detector 180. At the contacts 417, the relay R410 opens the holding circuit for the relay R305 but the latter relay is now held in its operated position over a circuit including its contacts 306, the winding of the relay R310, and the grounded conductor 394-ONG. In this circuit, the relay R310 also operates and, at its contacts 311, interrupts the previously traced locking circuit for the trunk access relay R210 to restore the latter relay to normal. The relay R210 in turn, at its contacts 212, interrupts the previously traced circuit for illuminating the trunk access pilot lamp L205 thereby to indicate to the exchange attendant that the call locked into the permanent signal holding circuit 135 has been taken care of. Also, at the contacts 213 and 214, the relay R210 reestablishes the circuit for the permanent signal holding circuit 135 and it simultaneously disconnects the holding ground potential on the conductor 226TD4 from the primary selector 120, the finder 115 and the cut-off relay R110 so that they may all restore to normal and rendered available for use in further telephone calls.

In the foregoing description of the operation of the trunk access circuit 200, it was pointed out that the trunk access relay R210 is operated by actuation of the keys K201 and K1010, if the signal lamp L203 is illuminated to indicate that a call has been routed to permanent signal holding circuit 135. It should be appreciated that a plurality of such individual permanent signal holding circuits may be provided and each circuit in turn will have an associated trunk access relay, corresponding to the relay R210, an individual signal lamp, such as L203, and an individual key, such as K201, included in the trunk access circuit 200. With such an arrangement, the exchange attendant is in a position to selectively determine which one of the trunk access relays is to be locked in its operated position if more than one of the associated signal lamps L203 is illuminated. In any event, the exchange attendant is in a position to lock a subscriber line to the exchange test equipment whenever the call on the associated line has been routed to a permanent signal holding circuit, such as 135. Also, the detector 180 can be operated to ascertain the directory number of at least one of the stations on the line that is involved in a faulty ground condition thereon of sufficient magnitude to cause the call to be routed to the permanent holding circuit 135. As soon as the directory number is ascertained, action may be taken to have the fault removed from the particular subscriber line that is in trouble.

In describing the operation of the testing apparatus, it has been assumed that it is provided at an exchange attendant's position. However, it should be understood that the same facilities may also be provided at a test desk test panel so that the wire chief or testman thereat may perform any of the tests for controlling the operation of the detector 180 as described hereinbefore. Such a test desk test panel 1080 is shown in block diagram form in Fig. 10 and it should be understood that it has facilities for controlling the apparatus illustrated in the drawings in the same manner as the exchange attendant.

The busy pilot lamp L1012 is illuminated whenever the test desk is using the test equipment illustrated in the drawings in order to advise the exchange attendant that the various keys provided for the exchange attendant are not to be actuated until the lamp is extinguished. Also, the test desk test panel 1030 is provided with the lamp panel equipment illustrated in the left-hand portion of Fig. 8 including the connect relay R820A and the various lamps 801A to 806A, inclusive. The lamp panels and equipment shown in the left-hand portion of Fig. 8 is exactly the same as that shown in the right-hand portion in the same figure. Consequently, it should be understood that whenever the test desk is utilizing the testing equipment, the connect relay R8020A will be operated to connect up the lamp panels 801A to 806A, inclusive, thereat instead of the correspondingly designated lamp panels (omitting the suffix A) provided for us by the exchange attendant.

While one embodiment of the invention has been disclosed, it will be understood that various modifications may be made therein which are within the spirit and scope of the invention.

What is claimed is:

1. In a telephone system, a subscriber line having an individual directory number, means for selecting said line, an identifier automatically operated to register the directory number of said subscriber line in response to a predetermined condition thereon, and means responsive to said seleection of said subscriber line for imposing said predetermined condition thereon.

2. In a telephone system, a subscriber line having an individual directory number, switching apparatus having access to said line, means for operating said switching apparatus in accordance with the digits of said directory number to complete a connection to said line, an identifier automatically operated to register the directory number of said subscriber line in response to a predetermined condition thereon, and means responsive to said completion of said connection for imposing said predetermined condition upon said subscriber line.

3. In a telephone system, a called subscriber station having a plural digit directory number, a line for said called station, switching apparatus having access to said line, a calling station, means at said calling station for operating said switching apparatus in accordance with the digits in said plural digit directory number of said called station to complete a connection from said calling station to said line for said called station, an identifier automatically operated to determine the digits in said plural digit directory number of said called station in response to a predetermined condition on said line, means responsive to said completion of said connection to said line for imposing said predetermined condition thereon, and a register operated by said identifier for registering the digits determined by said operation of said identifier.

4. In a telephone system, a called subscriber station having a plural digit directory number, a line connected to said station, switching apparatus having access to said line, a test position, means at said test position for operating said switching apparatus in accordance with the digits in said plural digit directory number of said called station to complete a connection from said test position to said called station, an identifier operative to determine said directory number of said called station, a register, means controlled from said position for associating said identifier with said register and for operating said identifier, and means for operating said register to register the digits of said directory number of said called station as determined by said operation of said identifier.

5. The telephone system set forth in claim 4, including a lamp panel at said position, and means controlled in accordance with the digits of said directory number registered in said register for illuminating the corresponding lamps on said panel.

6. In a telephone system, a plurality of subscriber lines, each of said lines identified by a plural digit directory number, means for selecting any one of said lines, an identifier common to said lines and automatically operated to determine the directory number of any one of said lines having a predetermined condition thereon, means responsive to said selection of said one line for imposing said predetermined condition thereon, and means for registering the directory number determined by said identifier.

7. In a telephone system, a subscriber line having a directory number, a detector normally operative automatically to ascertain the directory number of said line in response to a predetermined calling condition imposed upon said line incident to the extension of a call from said line, apparatus operative to complete a connection to said line, and means for operating said apparatus to complete said connection to said line and for imposing said predetermined calling condition upon said line, so as to effect operation of said detector to verify the directory number of said line.

8. In a telephone system, a subscriber station having an individual directory number, a line for said station, means controlled over said line from said station for extending telephone connections from said station to a desired destination, an identifier automatically operated to register the directory number of said calling station responsive to the extension of said connection, means for extending a connection to said line, and means controlled over said last-mentioned connection for simulating a calling condition on said line to operate said identifier to determine the directory number of said station.

9. In a telephone system, a subscriber station having an individual directory number, a line for said station, switching apparatus controllable over said line responsive to a call from said station for extending a connection from said calling station to a called destination, a detector automatically operated in response to a predetermined calling condition imposed upon said line incident to the extension of said call from said calling station to find said line and to register the directory number of said calling station, other switching apparatus operative to connect with said line to complete a call to said station and to impose said predetermined calling condition upon said line, so as to effect operation of said detector to find said line and to register the directory number of said called station.

10. In a telephone system including a test position, subscriber lines having subscriber stations thereon identified by different directory numbers, switching apparatus, an identifier connected to said lines, means at said position for operating said switching apparatus to extend a connection to any station on any line in accordance with the directory number thereof and for initiating operation of said identifier, and a register controlled in response to said operation of said identifier for registering therein the directory number of said called station.

11. In a telephone system including a test position, subscriber lines having subscriber stations thereon identified by different directory numbers, switching apparatus, an identifier connected to said lines, means at said position for operating said switching apparatus to extend a connection to any station on any line in accordance with the directory number thereof and for initiating operation of said identifier, a register controlled by said operation of said identifier for registering therein the directory number of said called station, a plurality of lamps, and means in said register for completing circuits for illuminating said lamps to indicate the directory number of said called station.

12. In a telephone system, a party line having a plurality of stations thereon, each of said stations having a different plural digit directory number, an identifier automatically operative to ascertain the directory number of any one of said stations on said party line in response to a predetermined condition imposed upon said party line and identifying said one station, means for selecting said party line and for imposing thereupon said predetermined condition corresponding to said one station, so as to effect operation of said identifier to ascertain the directory number of said one station.

13. In a telephone system, a party line having a plurality of stations thereon, each of said stations having a different plural digit directory number, a plurality of terminals corresponding respectively to each of said stations and respectively assigned the corresponding directory numbers, means operated in accordance with the directory number of a particular station for selecting the terminal individual thereto, an identifier automatically operative to identify the directory number of any station on said line having a predetermined condition upon the terminal individual thereto, means responsive to said selection of any one of said terminals for imposing said predetermined condition thereon, so as to effect operation of said identifier to identify the directory number of said one station on said party line corresponding to said selected one terminal, and means for registering said directory number identified by said identifier.

14. The telephone system set forth in claim 13, including means for controlling said identifier to identify successively the directory numbers of each of the different stations on said line by controlling said selecting means to impose successively said predetermined condition upon said terminals.

15. The telephone system set forth in claim 13, wherein said means for selecting the terminals individual to a particular station on said party line includes switching apparatus and means for holding said switching apparatus connected to a given selected terminal, and means for imposing successively said predetermined condition upon said terminals so as to control said identifier to identify successively the directory numbers of each of said stations on said party line while said switching apparatus remains connected to said given selected terminal.

16. In a telephone system having subscriber stations identified by directory numbers and having means for setting up connections between calling and called stations and for automatically routing such a call to a holding circuit whenever the calling line is in a faulty operating condition, the combination comprising a test position, means at said test position selectively actuated to lock-up said connection routed to said holding circuit, an identifier, means at said test position for controlling said identifier over said locked-up connection to identify the directory number of said calling station on said calling line, and a register at said test position operated to register the directory number identified by said identifier.

17. In a telephone system having subscriber stations identified by plural digit directory numbers and having means for automatically routing a connection from any calling station and intended for any desired called station to a holding circuit in order to simulate the extension of said connection to a busy called station, the combination comprising, a test position, means controlled from said holding circuit for signalling said test position of the call extended to said holding circuit, means at said test position for locking-in said connection extended to said holding circuit, an identifier operative to identify the directory number of a calling station, means at said psition for operating said identifier over said locked-in connection by simulating a calling condition on the line of said calling station, a register at said position, and means for connecting said register and said identifier in order to operate said register to register the directory number of the station identified by said identifier, whereby said test position is informed as to the directory number of the calling station involved in the connection locked to said test position.

18. A register for a telephone system, comprising a plurality of register relays operated in different code combinations in accordance with different numerical digits to be registered therein, a plurality of marking conductors, means controlled by operated ones of said register relays for normally marking different ones of said conductors to indicate the numerical values of the different digits registerable by the operated condition of said register relays, an auxiliary relay, and means for operating said auxiliary relay to alter the marking on said marking conductors from an indication of the numerical value of a digit registered by operated ones of said register relays to markings indicative of the identity of the operated ones of said register relays.

19. A register for a telephone system, comprising a plurality of register relays operated singly or in pairs in different combinations in accordance with different numerical digits to be registered therein, a plurality of marking conductors, means controlled by operated ones of said register relays for normally marking said conductors individually to indicate the numerical value of the different digits registerable by the operated register relays, an auxiliary relay operated automatically in response to the operation of more than a pair of said register relays, means selectively actuated to control the operation of said auxiliary relay independently of the number of operated register relays, and means controlled in response to the operation of said auxiliary relay for altering the marking on said marking conductors from an indication of the numerical value of a digit registered by operated register relay or relays to an indication of the identity of the particular operated register relay or relays.

20. The register set forth in claim 19, including signal lamps connected to said marking conductors to indicate the value of the numerical digit marked by the corresponding marking conductor, and an additional signal lamp illuminated in response to the operation of said auxiliary relay to indicate that the illuminated condition of said marking conductor signal lamps identify the operated register relays in said register.

21. A register for telephone system, comprising a plurality of register relays operated in different code combinations in accordance with different numerical digits to be registered, a plurality of marking conductors, means controlled by operated ones of said register relays for normally marking different ones of said conductors to indicate the numerical values of the different digits registerable by the operated condition of said register relays, and a single marginal relay included in the operating circuit for all of said register relays and operated only in the event that circuits are completed for more of said register relays than necessary to register any particular digit, and means controlled in response to said operation of said marginal relay for marking said conductors to identify each one of said operated register relays instead of the value of a digit.

22. In a telephone system including subscriber stations identified by corresponding individual directory numbers, switching means for setting up a connection from a calling one of said stations to a called one of said stations, an identifier responsive to the initiation of a call at any one of said stations for identifying the corresponding individual directory number, and means normally controlled from said one calling station for operating said switching means to extend a connection towards the called one of said stations and selectively controlled from said identifier responsive to the failure thereof to identify one of said individual directory numbers for operating said switching means to extend said connection to a hold circuit; the combination comprising a test position, means at said test position selectively actuated to lock-up said connection routed to said holding circuit, means at said test position for controlling said identifier over said locked-up connection to identify the directory number of said calling station, a register at said test position including a plurality of relays normally operative into only given combinations thereof from said identifier to register one of said individual directory numbers, and means included in said register responsive to the operation of said relays into a combination other than one of said given combinations for rendering an indication of the ones of said relays so operated.

References Cited in the file of this patent
UNITED STATES PATENTS

| | | |
|---|---|---|
| 1,688,993 | Smith | Oct. 23, 1928 |
| 2,102,769 | Ulrich | Dec. 21, 1937 |
| 2,351,551 | Seibel | June 13, 1944 |
| 2,619,545 | Hersey | Nov. 25, 1952 |
| 2,672,515 | Barlow | Mar. 16, 1954 |
| 2,672,520 | Voss | Mar. 16, 1954 |
| 2,724,020 | Judy | Nov. 15, 1955 |
| 2,782,257 | Blashfield et al. | Feb. 19, 1957 |